United States Patent
Holtman et al.

(10) Patent No.: US 12,286,751 B2
(45) Date of Patent: Apr. 29, 2025

(54) OXYGEN TREATMENT OF HIGH KAPPA FIBERS

(71) Applicant: GPCP IP Holdings LLC, Atlanta, GA (US)

(72) Inventors: Kevin M. Holtman, Appleton, WI (US); Jeffrey A. Lee, Neenah, WI (US); Daniel W. Sumnicht, Green Bay, WI (US); Daniel E. Miller, Appleton, WI (US)

(73) Assignee: GPCP IP HOLDINGS LLC

( * ) Notice: Subject to any disclaimer, the term of this patent is extended or adjusted under 35 U.S.C. 154(b) by 268 days.

(21) Appl. No.: 17/548,503

(22) Filed: Dec. 11, 2021

(65) Prior Publication Data
US 2022/0213648 A1    Jul. 7, 2022

Related U.S. Application Data

(60) Provisional application No. 63/134,222, filed on Jan. 6, 2021.

(51) Int. Cl.
*D21C 9/16*    (2006.01)
*D21C 5/02*    (2006.01)
(Continued)

(52) U.S. Cl.
CPC ............ *D21C 9/163* (2013.01); *D21C 5/02* (2013.01); *D21C 9/1057* (2013.01); *D21C 9/147* (2013.01);
(Continued)

(58) Field of Classification Search
CPC ...................................................... D21C 5/02
See application file for complete search history.

(56) References Cited

U.S. PATENT DOCUMENTS

| | | | |
|---|---|---|---|
| 2,514,503 | A | 7/1950 | Mcewen et al. |
| 3,462,344 | A | 8/1969 | Kindron et al. |

(Continued)

FOREIGN PATENT DOCUMENTS

| | | | | |
|---|---|---|---|---|
| CA | 2319223 A1 | * | 3/2002 | ........... D21C 9/1057 |
| EP | 0187477 A1 | | 7/1986 | |

(Continued)

OTHER PUBLICATIONS

Smook, Handbook for Pulp and Paper Technologists, 1992, Angus Wilde Publications, 2nd edition, chapters 13 and 16. (Year: 1992).*

(Continued)

*Primary Examiner* — Anthony Calandra

(57) ABSTRACT

Recycle fiber bleaching includes an oxygen pre-treatment to activate the fiber for further bleaching. A preferred method of making a high brightness papermaking pulp from recycled cellulose fiber includes: (a) pre-treating a first recycled cellulosic fiber mix with oxygen, said first recycled cellulosic fiber mix having a first high Kappa number prior to pre-treatment and a reduced Kappa number after pre-treatment that is lower than said first high Kappa number; and (b) blending the pre-treated first recycled cellulosic fiber mix with the reduced Kappa number with a second recycled cellulosic fiber mix having a second Kappa number lower than the first high Kappa number of the first recycled cellulosic fiber mix; and (c) oxidatively bleaching the blended recycled cellulosic fiber mix of step (b); and optionally (d) reductively bleaching the blended recycled cellulosic fiber mix of step (c).

20 Claims, 12 Drawing Sheets

(51) Int. Cl.
*D21C 9/10* (2006.01)
*D21C 9/147* (2006.01)
*D21H 11/14* (2006.01)

(52) U.S. Cl.
CPC .......... *D21H 11/14* (2013.01); *D21C 9/1036* (2013.01); *Y02W 30/64* (2015.05)

(56) References Cited

U.S. PATENT DOCUMENTS

| | | | |
|---|---|---|---|
| 3,655,505 | A | 4/1972 | Yorston et al. |
| 3,811,995 | A | 5/1974 | Ringley |
| 4,116,758 | A | 9/1978 | Ford et al. |
| 4,295,929 | A | 10/1981 | Leithem |
| 4,372,812 | A | 2/1983 | Phillips |
| 4,869,783 | A | 9/1989 | Prusas |
| 4,871,423 | A | 10/1989 | Grimsley et al. |
| 4,938,842 | A | 7/1990 | Whiting et al. |
| 5,011,572 | A | 4/1991 | Parthasarathy |
| 5,143,581 | A | 9/1992 | Devic |
| 5,169,495 | A | 12/1992 | Lachenal |
| 5,179,021 | A | 1/1993 | Du et al. |
| 5,211,809 | A | 5/1993 | Naddeo |
| 5,217,575 | A | 6/1993 | Backlund |
| 5,486,268 | A * | 1/1996 | Nguyen ............ D21C 5/02 162/13 |
| 5,503,709 | A | 4/1996 | Burton |
| 5,958,179 | A | 9/1999 | Selder |
| 5,997,689 | A | 12/1999 | Bokstroem |
| 6,007,678 | A | 12/1999 | Linsten et al. |
| 6,027,610 | A | 2/2000 | Back et al. |
| 6,059,927 | A | 5/2000 | Wan |
| 6,153,300 | A * | 11/2000 | Stromberg ......... D21C 9/1057 428/394 |
| 6,273,994 | B1 | 8/2001 | Creber et al. |
| 6,632,328 | B2 | 10/2003 | Wan |
| 9,556,558 | B2 | 1/2017 | Pylkkanen et al. |
| 10,000,889 | B2 | 6/2018 | Hart et al. |
| 10,000,890 | B2 | 6/2018 | Nonni et al. |
| 2002/0012912 | A1 | 1/2002 | Li et al. |
| 2004/0000012 | A1 | 1/2004 | Scarpello |
| 2008/0017337 | A1* | 1/2008 | Duggirala ............ D21H 21/30 162/158 |
| 2008/0087390 | A1* | 4/2008 | Lee ..................... D21C 9/1057 162/158 |
| 2009/0242152 | A1 | 10/2009 | Vilpponen et al. |
| 2012/0067532 | A1 | 3/2012 | Lee |
| 2013/0203699 | A1 | 8/2013 | Nonni et al. |
| 2021/0079594 | A1 | 3/2021 | Lee |

FOREIGN PATENT DOCUMENTS

| | | |
|---|---|---|
| EP | 0311356 A1 | 4/1989 |
| EP | 0480469 A2 | 4/1992 |
| WO | 9508021 A1 | 3/1995 |
| WO | 9600322 A1 | 1/1996 |
| WO | 2021123504 A1 | 6/2021 |

OTHER PUBLICATIONS

International Preliminary Report on Patentability received for PCT Application No. PCT/IB2020/058139, mailed on Feb. 9, 2022, 8 pages.
International Search Report and Written Opinion received for PCT Application No. PCT/IB2021/062425, mailed on Mar. 29, 2022, 11 pages.
International Search Report and Written Opinion that issued in PCT/IB2020/058139 on Dec. 1, 2020, 12 Pages.
Written Opinion of International Preliminary Examining Authority received for PCT Application No. PCT/IB2020/058139, mailed on Jun. 18, 2021, 07 Pages.
Grace, et al., "Pulp and Paper Manufacture: Alkaline Pulping", The Joint Textbook Committee of the Paper Industry, vol. 5, Third Edition, p. 401, 1989.
Non-final office action received for U.S. Appl. No. 17/006,089, mailed on Jun. 14, 2022, 13 pages.
Smook, "Handbook for Pulp and Paper Technologists," Angus Wilde Publications, 2nd edition, chapter 11, p. 10, (Year: 1992).
International Preliminary Report on Patentability received for PCT Application No. PCT/IB2021/062425, mailed on Mar. 28, 2023, 5 pages.
Notice of allowance received for U.S. Appl. No. 17/006,089, mailed on Oct. 26, 2022, 8 pages.

* cited by examiner

OXYGEN TREATMENT OF HIGH KAPPA FIBERS

CLAIM FOR PRIORITY

This application is based on U.S. Provisional Patent Application Ser. No. 63/134,222 filed Jan. 6, 2021, the priority of which is hereby claimed and the disclosure of which is incorporated herein by reference in its entirety.

TECHNICAL FIELD

The present invention relates to bleaching cellulosic pulps, especially bleaching wastepaper recycled pulp for manufacture of absorbent sheet such as tissue or towel products. The bleaching method includes a mild oxygen pre-treatment step on high Kappa content pulp derived from mixed paper, preferably blending the pre-treated fiber with a lower lignin content recycled fiber mix, followed by oxidative and/or reductive bleaching. The process is advantageously implemented with multi-stage bleaching protocols.

BACKGROUND

Delignification and bleaching of cellulosic pulp to produce high brightness feedstocks for paper manufacture is known in the art. U.S. Pat. No. 5,011,572 to Parthasarathy et al. describes a process for a two-stage oxygen delignification (i.e. with molecular oxygen) of chemical pulp in which 0.01% to 1% hydrogen peroxide is incorporated into the first and, optionally the second stage. The invention is particularly suitable when the pulp is subsequently bleached with at least one chlorine dioxide stage and at least one hydrogen peroxide stage.

U.S. Pat. No. 5,211,809 to Naddeo et al. relates to oxygen color stripping of secondary fibers. Color from dyes is removed from secondary pulps with non-chlorine based bleaching agents in treating sequences using oxygen with combinations of peroxide, ozone, and/or hydrosulfite at controlled pH conditions (less than 8 or greater than 10). According to the disclosure, acid treatment prior to bleaching steps improves color removal and protects fibers from damage at more severe bleaching conditions.

U.S. Pat. No. 5,486,268 to Nguyen relates to delignification of pulp derived from old corrugated containers (OCC) which has Kappa numbers on the order of 70 or 80 prior to treatment. The OCC are recycled employing oxygen delignification in the presence of an alkaline material to produce a recycled pulp of lower kappa number, while maintaining adequate strength in the pulp. The recycling process preferably employs an acid pretreatment in combination with the oxygen delignification, and exposure of the waste product to the alkaline material is preferably controlled so that at any point in the delignification the waste product is exposed to not more than 50%, by dry weight, of the alkaline material based on the weight of residual lignin in the waste paper product. The treated pulp has Kappa numbers of from 15 to 35 according to the reference.

U.S. Pat. No. 5,958,179 to Gehr et al. discloses a process for increasing brightness of pulp derived from printed wastepaper. The process may include using paper fiber pulp, derived in part from printed waste paper, into a suspension with water. The suspension may be mixed with bleaching aids and bleaching chemicals, including molecular oxygen. Pre-treatment includes intensely mechanically treating the pulp, e.g., at least 20 kWh/ton, prior to bleaching the pulp suspension with or without bleaching chemicals. See Col 7, lines 3-32.

U.S. Pat. No. 5,997,689 to Bokstrom is directed to a method of bleaching secondary fibers. A secondary fiber pulp is first slushed and then transferred at a consistency of 20-40% to a disperser. In the disperser, the secondary fiber pulp is mechanically treated and mixed so that ink particles in the secondary fiber pulp are dispersed throughout the secondary fiber pulp. While the secondary fiber pulp is being treated and mixed in the disperser, oxygen is delivered to the disperser so as to distribute the oxygen within the secondary fiber pulp which is then delivered to a bleaching tower.

U.S. Pat. No. 6,059,927 to Wan et al. describes a method for reducing brightness reversion and yellowness (b*) of bleached mechanical wood pulps. The pulp is digested in an aqueous formaldehyde solution containing carbonate, preferably in an amount up to 30% by weight of pulp. Paper made from the digested pulp can be further improved by treating with a reversion inhibitor such as a polyethylene glycol bisthiol.

U.S. Pat. No. 6,632,328 to Wan et al. is directed to a method for bleaching unbleached softwood or hardwood pulps using hydrogen peroxide without added alkali for activation. The aqueous hydrogen peroxide solution contains an alkaline earth metal carbonate, preferably magnesium carbonate and can be used at elevated temperatures. Bleached hardwood or softwood mechanical pulps with high brightness, low yellowness (b*) and reduced reversion properties are reported.

U.S. Pat. No. 10,000,890 to Nonni et al. relates to fiber with improved anti-yellowing. Col. 6 lines 7-32 refers to oxygen de-lignification of the pulp after it has been cooked to a Kappa number from about 17 to 21; bleaching is carried out after the Kappa numbers reach 8 or less.

There are several limitations to the raw material technically viable to produce fully bleached secondary fiber. The most significant limitation is Kraft "brown" fiber contamination. Chemically pulped Kraft brown fiber is not typically considered to be bleachable by traditional secondary fiber bleaching sequences. The brown fiber contains significant alkali darkened lignin content that is resistant to alkaline hydrogen peroxide and reductive bleaching stages commonly used at deinking mills. In order to produce fully bleached fiber in a Kraft mill this brown stock is conventionally subjected to an oxygen delignification stage followed by multiple bleaching and lignin extraction stages. The entire process is designed to substantially remove the darkened lignin leaving the high brightness cellulose behind. This process is very capital intensive (billions of dollars) and is extremely complicated.

"Mixed paper" (MP) is primarily sourced from residential curbside recycling. The paper can be both sorted and unsorted/raw. Typically, the sorting operation will remove both non-paper contaminants and selected paper grades that have significant market value. Currently much of the old corrugated container (OCC) is removed. While varying greatly, mixed paper is comprised of a mixture of printing grade white paper, brown Kraft paper, higher brightness mechanical grades and newsprint. Both the mechanical grades and newsprint contain high amounts of lignin. With a high lignin content (Kappa #60-65) this fiber source is not typically considered a suitable replacement for sorted office waste.

Sorted office waste (SOW or SOP) is comprised substantially of white paper and, as received, has a high brightness (67 ISO) and low lignin content (Kappa #20 or less). Mixed paper has the high Kappa # and a low brightness (38 ISO). It is commonplace to utilize a peroxide stage followed by hydrosulfite (dithionite) reductive bleaching stage to brighten the sorted office paper to a brightness sufficient for re-use in a consumer product. This approach becomes inadequate when introducing substantial amounts of brown fiber into the supply.

Mixed paper is abundant and very low cost but cannot be used in substantial amounts to produce fully bleached secondary fiber by conventional means because of the limitations noted above.

SUMMARY OF INVENTION

In accordance with the invention, it has been surprisingly found that a mild oxygen treatment renders brown fibers bleachable by hydrogen peroxide and other suitable secondary fiber bleaching technologies. The oxygen step delignifies the pulp to a modest extent to a level that would not be considered bleachable by known processes. The limited amount of lignin removal indicates an "activation" step rather than a conventional delignification step. The activation allows significant brightening in subsequent bleaching steps despite the presence of significant amounts of alkali darkened lignin.

There is thus provided in one aspect of the invention a method of pre-treating and bleaching papermaking pulp from recycled cellulosic fiber comprising: (a) pre-treating a recycled cellulosic fiber mix with oxygen, said recycled cellulosic fiber mix having a first high Kappa number prior to pre-treatment and a reduced Kappa number after pre-treatment that is lower than said first high Kappa number; and (b) bleaching the pre-treated recycled cellulosic fiber mix of step (a).

The various bleaching technologies for recycled fiber which may be employed in a multi-stage bleaching operation are summarized in FIG. 1, wherein the oxygen pre-treatment is designated as an "0" stage.

It is seen on the right hand side of FIG. 1 that an ISO Brightness gain of 44+ is readily achieved with the present invention, enabling the use of higher levels of MP recycled pulp for high brightness furnish.

It was also discovered that the activation step has a significant yellowing effect on lower Kappa SOW and is preferably not used for treating this fiber source to produce high brightness bleached furnish. The yellowing of already brightened fiber causes reversion/resistance to further brightening and prevents achieving target brightness. This discovery allows the oxygen step to be much more targeted in a commercial installation because only the mixed/brown fiber need be treated, while the lower Kappa sorted office waste fiber need not, indeed should not, be pre-treated prior to bleaching. This results in savings both in capital and operating expense.

There is thus provided in accordance with another aspect of the invention a method of making a high brightness papermaking pulp from recycled cellulose fiber comprising: (a) pre-treating a first recycled cellulosic fiber mix with oxygen, said first recycled cellulosic fiber mix having a first high Kappa number prior to pre-treatment and a reduced Kappa number after pre-treatment that is lower than said first high Kappa number; and (b) blending the pre-treated first recycled cellulosic fiber mix with the reduced Kappa number with a second recycled cellulosic fiber mix having a second Kappa number lower than the first high Kappa number of the first recycled cellulosic fiber mix; and (c) oxidatively bleaching the blended recycled cellulosic fiber mix of step (b); and optionally (d) reductively bleaching the blended recycled cellulosic fiber mix of step (c). This aspect of the invention is better appreciated with reference to FIGS. 2A, and 2B.

There is shown in FIG. 2A and FIG. 2B multi-stage bleaching systems which may be employed in accordance with the present invention. In FIG. 2A system 10A includes an oxygen pre-treatment stage 12, an oxidative bleaching stage 14 which may be an EOP stage, a P stage or an extended duration bleaching stage; a peroxide bleaching (P) stage 16 and a reductive bleaching stage 18. Between each of the stages may have a wash stage 20, 22, 24 as indicated.

In FIG. 2A a 50/50 mix of MP and SOP with an ISO Brightness of around 45 is fed to oxygen pre-treatment stage 12, processed as described herein and fed to wash stage 20. From stage 20, the pre-treated pulp is fed to oxidative bleach stage 14 and bleached as described herein. From stage 14 the partially bleached pulp is fed to wash stage 22 and then to peroxide stage 16 where the pulp is further brightened. The pulp is fed from stage 16 to wash stage 24 and then to reductive bleaching stage 18 as shown. In stage 18 the pulp is color stripped further and recovered as high bright clean (HBC) recycle pulp with an ISO Brightness of about 78.

System 10B of FIG. 2B is constructed and operated in substantially the same manner as FIG. 2A, except that the MP is pre-treated in stage 12 with oxygen prior to being blended with SOP, the MP having an initial ISO Brightness of about 38. After oxygen pre-treatment, unbleached SOP is then blended in, as indicated at 25, prior to further processing in the system as described above. After reductive bleaching in stage 18, finished pulp is recovered at 30 having an ISO Brightness of about 83, five (5) points better than processing in system FIG. 2A using the same materials.

The invention is thus advantageously practiced by utilizing a unique oxygen treatment on a high Kappa secondary fiber mix followed by:

(a) Mixing with a lower Kappa and higher brightness secondary fiber mix;
(b) Bleaching the mixed secondary fiber blend utilizing a 2 or 3 stage oxidative+reductive bleaching sequence; and
(c) Producing a high bright clean paper making pulp of over 80 brightness and above 15 Kappa.

In any embodiment of the present invention, a plurality of sequential oxidative bleaching stages may be employed in order to brighten the recycle fibers.

The invention addresses many long felt needs in the industry and allows for the use of relatively low brightness recycle pulp which is increasingly available at relatively low cost.

Further advantages and features of the invention are appreciated from the following description and appended drawings.

BRIEF DESCRIPTION OF DRAWINGS

The invention is described in detail below with reference to the drawings wherein like numerals designate similar parts and wherein.

DETAILED DESCRIPTION

Figure 1:
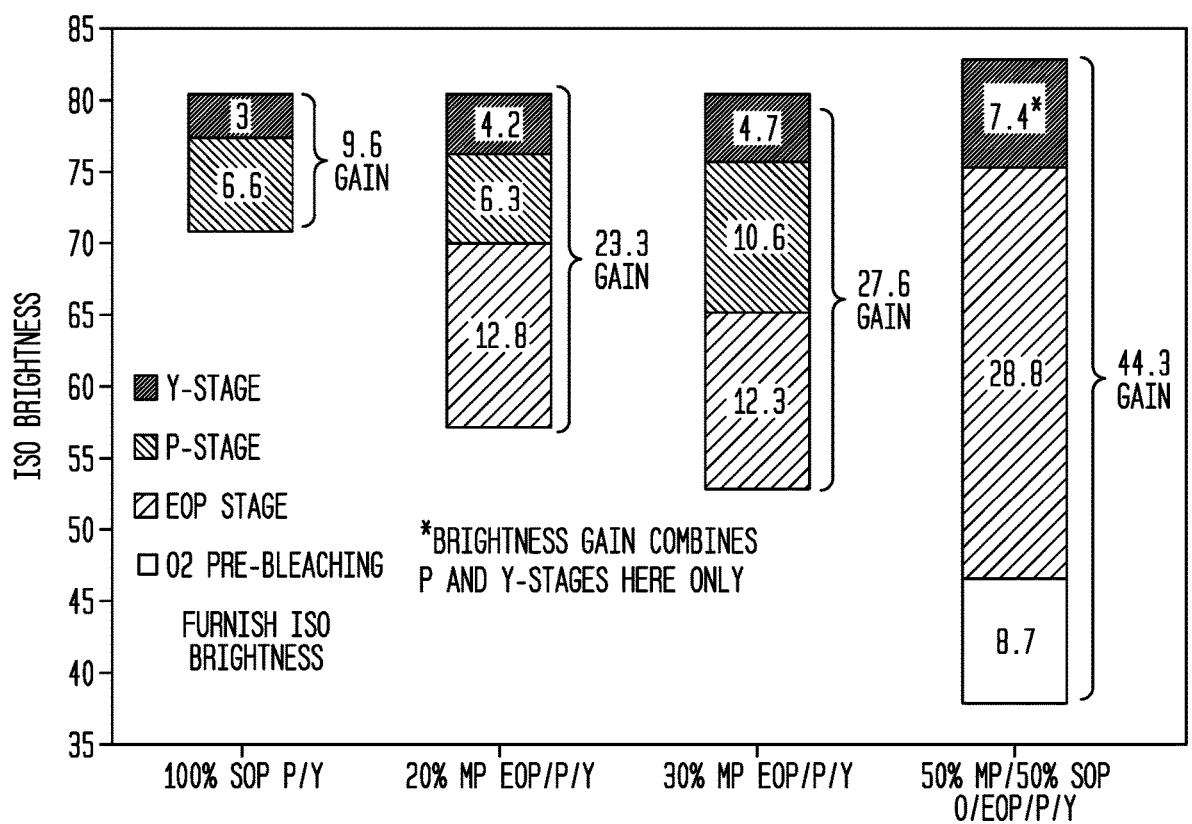
FIG. 1 is a histogram illustrating brightening of recycle pulp in multi-stage processes.

The invention is described in detail below in connection with the Figures for purposes of illustration only. The invention is defined in the appended claims. Unless otherwise indicated, terminology used herein is given its ordinary meaning consistent with the exemplary definitions set forth immediately below; g, or G refers to grams, MT means metric ton, percents, ppm and like terminology relates to weight percent, parts per million by weight unless otherwise indicated and so forth.

An alkaline agent means a compound used to adjust the pH of the bleaching liquor to relatively high values. Hydroxides such as caustic, sodium hydroxide are preferred.

Bleaching temperature and like terminology refers to the temperature maintained in a bleaching stage or a vessel over the retention time of bleaching, and may be referred to as retention temperature.

"ISO Brightness" or simply brightness as used herein refers to the measured brightness of the pulp made into handsheets in accordance with TAPPI Test Method T 525 om-17 or equivalent, with C-illumination. Diffuse reflectance is measured in the wavelength range of 400-520 nm with an effective wavelength of 457 nm by using a suitable filter set or an equivalent device for modifying the spectral response and an instrument having diffuse illumination and perpendicular observation geometry. The measurements are made in terms of absolute reflectance factors. Brightness testing is done on handsheets using a MacBeth Ci5 instrument. Brightness gain is expressed as a percentage relative to the brightness of the pulp prior to bleaching.

"Chemical wash", "wash" or like terminology refers to a washing step with water to remove chemicals and bleaching residues from the pulp. A washing step is usually advisable following a peroxy bleaching step, before a subsequent stage, and is usually required between peroxy bleaching steps to optimize results. When implementing the present invention section, a wash is provided between pre-treatment and bleaching stages unless otherwise indicated.

"Consisting essentially of" and like terminology with respect to compositions refers to the recited components and excludes other ingredients which would substantially change the basic and novel characteristics of the composition, article or process. Unless otherwise indicated or readily apparent, a composition or article consists essentially of the recited or listed components when the composition or article includes 90% or more by weight of the recited or listed components, optionally on a dry basis, that is, without water. The terminology thus excludes more than 10% unrecited components. In connection with methods of bleaching or oxygen treating of pulp, the terminology consisting essentially of recited steps excludes additional bleaching or oxidative treatments, but does not exclude washing steps interposed between bleaching or oxygen treatment steps.

Consistency, % C or like terminology refers to percent solids of a pulp slurry calculated on a dry basis. A slurry having 80 percent water and 20 percent dry pulp has a consistency of 20 percent. Unless otherwise indicated, dry pulp, dried pulp and like terminology means oven dry pulp, which may have up to a few percent water.

A Kappa number is determined in accordance with TAPPI Method T236-0M-99 or equivalent. The Kappa number is the volume (in millimeters) of 0.1N potassium permanganate solution consumed by one gram of moisture-free pulp. The results are corrected to 50% consumption of the permanganate added. Kappa numbers are commonly used to determine lignin content and used to determine bleachability of pulp.

"Oxidative" bleaching and like terminology refers to bleaching or oxidative brightening operations with oxidative beaching agents such as oxygen, ozone, peroxy compounds, chlorine, chlorine dioxide, hypochlorite; for example P stages, EOP stages, Paa stages and so forth.

"Percent on pulp" "OP" and like terminology refers to the weight ratio of a hydrogen peroxide/dried pulp X100% in a charge to a bleaching stage.

"Percent consumed on pulp" and like terminology refers to the weight ratio of hydrogen peroxide actually consumed in a bleaching stage/dried pulp content in the charge to the bleaching stage X100%.

Percent on pulp, OP, "Percent consumed on pulp" may likewise be expressed for hydrogen peroxide and other peroxy bleaching agents as kg-moles/metric ton of dried pulp, it being noted that 1% OP or 1% Percent consumed on pulp corresponds to 0.295 kg-moles bleaching agent/metric ton of dried pulp.

A bleaching or delignification "stage" refers to bleaching or otherwise treating pulp in a vessel under a specified set of conditions. Subsequent stages may be undertaken in the same vessel for batch or semi-batch processes and in downstream vessels for continuous processes.

"Peroxy compound" and like terminology refers to compounds having a peroxo group. Typically one employs hydrogen peroxide in the bleaching method of the invention; however, one may utilize other peroxy compounds as a bleaching agent or for delignification if so desired. Other suitable peroxy bleaching compounds include peroxyacetic acid, peroxyformic acid, potassium peroxymonosulfate, dimethyldioxirane, peroxymonophosphoric acid and so forth.

A "reductive bleaching agent" refers to a reducing agent used to bleach pulp. Commercial systems may employ a mix of sodium borohydride and sodium bisulfite that form sodium hydrosulfite either in situ with the pulp or in a mixing step prior to addition to a reductive bleaching stage. Alternatively, sodium hydrosulfite as such may be used as available. These bleaching agents and equivalents are referred to as hydrosulfite bleaching agents. Additional reductive bleaching agents which may be used include formamidine sulfinic acid (FAS) and hydroxymethane sulfinic acid (HAS), as well as dithionites. See U.S. Pat. No. 4,871,423 to Grimsley et al. When a reductive bleaching agent is used in a bleaching stage, the stage is referred to as a reductive bleaching stage, a Y stage or with like terminology.

"Retention time" and like terminology refers to the duration of bleaching under a specified set of conditions in a bleaching stage. Temperatures, retention temperatures and the like refer to temperatures maintained during the retention time in a bleaching vessel.

Conventional pulp bleaching stages are commonly referred to as Y stages, EO stages, EOP stages, Paa stages or P stages.

A "Y" stage refers to a reductive bleaching stage utilizing a reductive bleaching agent.

An "EO" stage refers to an alkaline, oxygen based bleaching stage carried out under oxygen pressure of from 0.25 to 1 Mpa in most cases.

An "EOP" stage refers to an EO stage with a peroxy bleaching agent present.

A "P" stage refers to a conventional alkaline peroxy bleaching stage, usually with hydrogen peroxide, referred to as peroxide. Representative operating parameters for a P stage appear in Table 1.

TABLE 1

Operating Parameters for P Stage bleaching

| Peroxide %<br>OP | NaOH %<br>OP | Temperature<br>° F./° C. | Retention<br>Minutes |
|---|---|---|---|
| 1% | 1% | 185/85 | 60 |
| 3% | 3% | 185/85 | 60 |

A P(A,B) stage refers to the caustic OP (A) and hydrogen peroxide OP (B) during treatment. Thus, a P(3,5) stage indicates peroxide bleaching with 3% caustic OP and 5% peroxide OP unless otherwise indicated. In some cases, the parentheses are omitted.

A Paa stage refers to treatment of the pulp with a peroxyacid or related compound which is operative to remove lignin and optionally, to bleach the pulp. See U.S. Pat. No. 6,007,678 to Linsten et al.

The processes of the invention are typically integrated into a multi-stage treatment protocol with sequential steps indicated from left to right on the various Figures and/or sequential steps are indicated by/marks. Thus a P/Y regimen indicates a P stage followed by a Y stage and so forth.

Each of these conventional processes is carried out for a retention time of from about 5 minutes to about 3.5 hours, typically from 10 minutes to 2.5 hours of retention time and in many cases for a retention time of from 15 minutes to 1 hour. These processes are likewise carried out at relatively elevated temperatures, generally from 50° C. to about 150° C., with from 65° C. to about 125° C. being typical. Bleaching at over 100° C. requires a pressurized reactor, which involves high capital costs.

Recycle pulps such as SOW and MP are composed of papermaking fibers that have been separated by chemical or mechanical treatment. The fibres may be of hardwood or softwood. The term chemical pulp relates to pulps digested according to the Kraft (sulphate), sulphite, soda or organosolv process. The term mechanical pulp refers to pulp produced by refining chips in a disc refiner (refiner mechanical pulp) or by grinding logs in a grinder (groundwood pulp). The terminology mechanical pulps also relates to pulps produced by modifications or combinations of the above-mentioned methods or processes. Examples of such pulps are thermomechanical, chemimechanical and chemithermo mechanical pulps. Prior to recycling, the pulps may have been already bleached, for example, bleached chemithermo mechanical pulps (BCTMP) are sometimes present in the recycled material.

Utilizing current proprietary recycling techniques, Applicant can achieve 20-30%, amounts of mixed paper into fully bleached recycle pulp production. An oxygen alkaline peroxide (EOP) stage had shown the capability to decolorize brown fibers to some extent allowing perhaps 10% mixed paper when followed by a reductive bleaching (Y) stage. Still further advantages are seen with 3-stage EOP/P/Y sequences. The Psv, or High Efficiency Fiber bleaching process utilizes extended duration, low temperature peroxy bleaching which is also effective to decolorize brown fiber. This bleaching process allows as much as 20-30% mixed paper when utilized as part of a three-stage bleaching process (both with and without an oxygen stage in the sequence).

Despite advances in the art, there is still a long-felt need to accommodate significantly higher amounts of the mixed paper fiber into the bleached furnish supply. To this end, an alkaline oxygen (EO) bleaching stage was inserted prior to two-stages of peroxide bleaching to activate the brown fiber towards brightening by the peroxide bleach. Suitable conditions are for example, treating the pulp at 10-30% consistency for 10-200 minutes at 80 to 90 or 95° C. temperature and an oxygen pressure of 0.25 to 1 Mpa (36-145 PSIG). The oxygen charged amounts to approximately 1% oxygen on oven dry (OD) fiber on a weight basis; the actual consumption of oxygen is significantly less. Specific conditions may include EO bleaching for 60 minutes at 80-87.5° C. temperature at 60 PSIG (0.414 MPa) charge of oxygen at the beginning of the retention and the oxygen vented and recharged at 15 minutes. EO bleaching is carried out, for example, with 3-9% NaOH OP in the process.

Using an EO stage as a first stage, i.e., without hydrogen peroxide was based based, in part, on the discovery that alkaline darkening in a first stage could be recovered in a subsequent alkaline peroxide stage. Additionally, hydrogen peroxide cost is reduced. The NaOH dose during pretreatment is suitably 1-15% OP, more typically 3-9% OP. Mixed paper contains significant unbleached Kraft fiber that is dark brown in color and contains significant lignin. The alkali dose is selected to provide brightening without excessive delignification, that is a Kappa Reduction of less than 50% based on the Kappa number prior to oxygen pretreatment. For example, if the initial Kappa number of the secondary fiber is 60 before pre-treatment, the Kappa number after oxygen pre-treatment is greater than 30. In various embodiments, the Kappa Reduction is less than 40%, 35%, 30%, 25% or 20% based on the Kappa number prior to oxygen pretreatment. This limited reduction in lignin contrasts the invention with conventional oxygen delignification, where the Kappa Reduction is typically well in excess of 50%.

Suitable conditions for pre-treating mixed paper with oxygen and caustic prior to further bleaching appear in Table 2 below.

TABLE 2

O Stage Pretreatment, Mixed Paper

| Parameter | General | Typical | Preferred |
|---|---|---|---|
| pH | 8-13 | 8.5-12.5 | 9.5-12.5 |
| % NaOH OP | 1-15 | 3-10 | 3-6 |
| T, ° C. | 60-120 | 75-115 | 80-115 |

TABLE 2-continued

O Stage Pretreatment, Mixed Paper

| Parameter | General | Typical | Preferred |
|---|---|---|---|
| $O_2$ P, PSIG | 36-145 | 75-130 | 80-120 |
| $O_2$P, MPa | 0.25-1 | 0.52-0.9 | 0.55-0.83 |
| Consistency, % | 3-30 | 5-20 | 6-15 |
| Residence Time (min) | 30-150 | 65-130 | 70-115 |
| Kappa Reduction | 5-35 | 10-30 | 15-25 |
| ISO Increase | 0 or less-15 | 3-12 | 4-10 |

Typical laboratory procedures used for processing recycle pulp are provided immediately below.

Pulp Sources 13 buckets of mixed paper pulp (MP) and 2 buckets of System 2 of unbleached sorted office paper (SOP) grade were collected and placed in cold storage. The pulp was further centrifuged in the bleach plant and crumbled by hand. The measured consistency was 36.8% solids. Table 3 compares the fiber composition of our existing furnish sorted office paper versus that of mixed paper. SOP is dominated by hardwood kraft fiber which is indicative of bleached fine kraft paper. The enriched proportions of softwood kraft and mechanical fiber in mixed paper represents the much higher brown kraft and mechanical (groundwood/newsprint) content. Mixed paper routinely has a kappa number of 60-65 analogous to ~9% lignin content.

TABLE 3

Mechanical pulp content of mixed paper pulp.

| Sample ID | % HWK | % SWK | % Mech |
|---|---|---|---|
| Mixed paper | 37.0 | 29.0 | 34.0 |
| Sorted office paper | 66.5 | 24.6 | 8.9 |

Baled MP was likewise obtained. The bale was sorted into segregated printing & writing grade (P&W), OCC, and assorted mechanical grades (ONP was used as the acronym for this mixed grade). The recycle pulp was received having not been deinked while the baled material was whole post-consumer waste. Both were pulped and washed to remove ink as described below and then bleached by the Q/O/EOP/P/Y process. As described herein.

Hi-Con Pulping/Washing

Hi-con pulping was performed in the LaMort laboratory pulper at a total volume of 20 L and a consistency of 11-14% varying water addition as visibly necessary to achieve optimal mixing. Rotor speed was 480 rpm, power output was 27% and pulping time was generally 25-30 min. Pulping time was controlled to a VSI (Visible Specks Index) of 5-6.

Subsequently, the pulp was removed and washed for 1 min in thin layer batches in the hand screen with high pressure water as a means of partial ink removal. Visual inspection of before and after handsheets confirmed that the pulp was lighter as a result of the hyperwash-like treatment. However after the pulp was dewatered on the large Buchner funnel, the pulp on the filter side had a distinct gray-blackish hue resulting from ink migration through the pulp. No flotation was applied at any point in the process to remove ink.

Acid Chelation (Q Stage)

For practicality, acid chelation was performed at 5% solids and a pH 2-3 for the purpose of removing counterions, particularly transition metals which reduce the stability of $H_2O_2$. In the laboratory is somewhat impractical to do large volumes at moderately high temperature (70° C.). Preferably one would do the chelation at 3% solids at 80° C. with overhead mixing for continuous homogenization of the pulp.

Using available equipment, 500 g oven dry (OD) pulp was suspended at 5% consistency in a 3-gal (12-L) stainless steel bucket and the pH was adjusted to using concentrated $H_2SO_4$. The buckets were placed in the large water bath set at 85° C. water temperature. The actual temperature of the pulp reached 65° C. although the target was 70° C. The pulp was hand mixed periodically and was allowed to chelate for 1.5 h because the target temperature was not achieved. At the end of chelation, the pulp was washed to neutral in the screen basket in the sink with high pressure tap water and dewatered in the large Buchner.

Results thus far are inconclusive as to whether we need acid chelation before our oxygen pre-bleaching. In previous experiments, analysis showed that metals contents were relatively low as seen in the table below.

TABLE 4

Transition metal ion concentration in mixed paper furnish before and after acid chelation.

| | Mn | Fe | Cu | Zn | K | Ca | Mg | Na |
|---|---|---|---|---|---|---|---|---|
| Untreated mixed paper | <2 | 75.2 | 3.55 | 5.76 | <80 | 1390 | 162 | 142.1 |
| Chelated mixed paper | <2 | 25.2 | 2.54 | <2 | <70 | 334 | 99.7 | 26.3 |

Table 4 provides a comparison of the primary ions of interest before and after the chelation. As can be seen the chelation was highly effective in reducing the number of counter ions present in the pulp and specifically the transition metals. However, transition metals content before chelation was already fairly low compared to literature values and bleaching species may be stable without the acid chelation step.

Oxygen Pre-Treatment (O Stage)

200 g oven dry (OD) pulp were placed in the pre-heated Quantum mixer bowl. $MgSO_4$ was dissolved in water and then the NaOH was also dissolved at a concentration of 3-15%. The lid was quickly attached to the top of the bowl, the reactor pre-mixed for 5 seconds and the reaction cycle started. Simultaneously the oxygen cylinder was attached to the mixer and the mixer pressurized to 100 psi. The headspace was purged three times to displace air and ensure a pure $O_2$ atmosphere. The pulp was allowed to react for 100 min at 100° C. The high shear mixer was set to mix for 5 seconds every 2 minutes. Upon the end of reaction time, the pulp was tested for final pH and washed with 2 L of water.

TABLE 5

Conditions used for $O_2$ pre-bleaching of mixed paper.

| | $O_2$ |
|---|---|
| % C | 14 |
| NaOH, % | 3-15 |
| $MgSO_4$, % | 0.15-0.6 |
| $O_2$, psi | 100 |
| temp, ° C. | 100 |
| time, min | 100 |

This work was largely focused on studying the impact on yellowing in the O-stage, as is discussed below. All mixed paper and mixed paper blends used in this study were all derived from O-stage with 3, 6, 12% NaOH. The paper segregated from the mixed paper bale was $O_2$ pre-bleached at 6% NaOH. The proceeding bleaching stages were all performed at standard application of 4% NaOH/8% $H_2O_2$ in the Eop stage and 3% NaOH/3% $H_2O_2$ in the P-stage unless otherwise denoted. All Y-stages were done at 1% $HSO_3^-$.

$1^{st}$ Stage Peroxide without Oxygen (P or $P_1$)

First stage or later peroxide bleaching can be done at atmospheric or low pressure in containers that cannot tolerate oxygen pressures. 30 g OD pulp were added to a Hobart mixer and the peroxide solution as described above was added to the bowl and the pulp compounded for 1 minute on speed 1 and then the hydroxide solution was added to the Hobart and the pulp was compounded for 2 minutes on speed 2. The pulp was then transferred to a bleach bag, the bag sealed and mixed by hand and placed in the water set at 92° C. to achieve 80° C. in the bag. Bags were again mixed every 20 min or so for 2 hours.

$2^{nd}$ Stage Peroxide ($P_2$)

Second stage peroxide stage bleaches were performed identically as described above.

TABLE 6

Range of conditions for final P-brightening stage.

| | P |
|---|---|
| % C | 12 |
| $H_2O_2$, % | 2-4 |
| NaOH, % | 2-3 |
| $Na_2SiO_3$, % | 1-1.5 |
| temp, ° C. | 80 |
| time, min | 120 |

$1^{st}$ or Subsequent Stage Peroxide with Oxygen (PO or EOP or $E_{op}$)

First or later stage peroxide bleaching with oxygen is carried out as follows: 200 g OD pulp were placed in the pre-heated Quantum mixer bowl. $H_2O_2$ was added to a quantity of water and dispersed and Cinburst 2350 (chelant) was added to that same water. The $Na_2SiO_3$ and then the NaOH was dissolved in the remainder of the water at a concentration per Table 7. The peroxide solution was first added to the Quantum mixer and then the hydroxide. The lid was quickly attached to the top of the bowl and the same procedure as above was followed. The mixer was pressurized to 70 psi and the pulp was allowed to react for 90 min at 80° C. The pulp was tested at the end for residual pH and peroxide consumption and washed 2 L $H_2O$.

TABLE 7

Conditions range for oxygen reinforced peroxide bleaching.

| | EOP |
|---|---|
| %c | 12 |
| $H_2O_2$, % | 8 |
| NaOH, % | 3-4 |
| $Na_2SiO_3$, % | 0.5 |
| $O_2$, psi | 70 |
| temp, ° C. | 80 |
| time, min | 90 |

Extended Duration Oxidative Bleaching Also Referred to as Peroxide Sous Vide ($P_{sv}$)

Extended duration oxidative bleaching, or $P_{sv}$ is a new type of bleaching stage developed by Applicant. $P_{sv}$ literally means "under vacuum" but in actual application it represents a low temperature, long cook stage. This technology can be retrofit for little cost to essentially achieve high brightness at low operating cost. Low temperature, long retention produced a brightness that was 2-3 points lower other options, but has advantages of lower energy costs and minimal additional capital investment. $P_{sv}$ can whiten colored fibers that conventional high temperature applications do not. What is likely occurring is the longer residence time is allowing the slower reaction pathways to be completed rendering the slow to oxidize moieties to be brightened.

A large sample of the 80/20 SOP/mixed pulp was prepared and split into three samples. Psv bleaching was set up for the three samples with a 6 hour delay between samples. This allowed hourly testing for 24 hours. The brightness, pH and residual $H_2O_2$ were measured every hour. Additionally some samples were retained at temperature for 90 hours and then tested. The bleaching conditions were 2% OP $H_2O_2$, 2% OP NaOH and 0.5% OP Sodium Silicate. The retention temperature was 125° F. Details appear in Table 8.

TABLE 8

Psv Bleaching Characteristics

| Elapsed Time Hr | Sample Brightness | | | pH | | |
|---|---|---|---|---|---|---|
| | Sample 1 | Sample 2 | Sample 3 | Sample 1 | Sample 2 | Sample 3 |
| 0 | 58.1 | 58.1 | 58.1 | | | 11.2 |
| 1 | 63.4 | 63.6 | | 11.12 | 10.74 | |
| 2 | 65.9 | 66.3 | | 10.94 | 10.62 | |
| 3 | 66.8 | 67.6 | | 10.93 | 10.7 | |
| 4 | 69.3 | 68.9 | | 10.87 | 10.41 | |
| 5 | 70.3 | 70 | | 10.89 | 10.83 | |
| 6 | 70.6 | | | 10.95 | | |
| 7 | 69.8 | | | 10.95 | | |
| 8 | 71.6 | | | 10.91 | | |
| 9 | 71.5 | | | 10.87 | | |
| 10 | 72 | | 72.7 | 10.77 | | 11.11 |
| 11 | 72.6 | | | 10.78 | | |
| 12 | 72.3 | | 72.4 | 10.7 | | 11.1 |
| 13 | | | 73.3 | | | 11.03 |
| 14 | | | 73.4 | | | 11.04 |
| 15 | | | 73.5 | | | 10.98 |
| 16 | | 73.4 | | | 11.17 | |
| 17 | | 73 | | | 11.03 | |
| 18 | | 73.6 | | | 11.01 | |
| 23 | 72.9 | | | 11.06 | | |
| 24 | 73 | | | 11.03 | | |
| 90 | | | 72.1 | | | |

Figure 3:
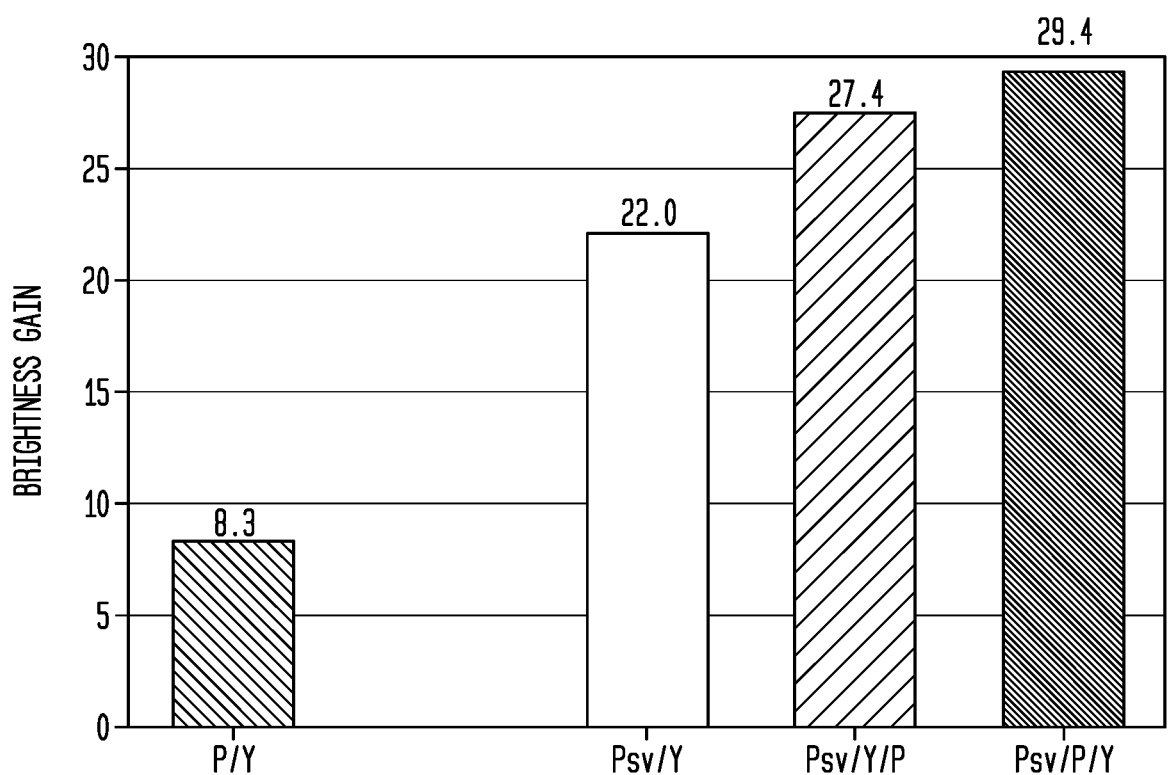
FIG. 3 is a histogram showing multi-stage bleaching of secondary pulp, including Psv bleaching.

Comparison with conventional P stage bleaching and multistage evaluation are seen in FIG. 3. Further details are seen in copending U.S. patent application Ser. No. 17/006,089, the disclosure of which is incorporated herein by reference. In general, Psv stages are carried out for a bleaching retention time in an extended duration bleaching stage for a retention time of least 6 hours; suitably from 6 to 90 hours or more, such as for at least 9 or 12 hours up to 90 hours or more.

Reductive Bleaching Stage/Washing (Y/W)

The reductive bleaching step is essentially performed to color strip (deactivate dyes in the pulp). This is done in the glove box purged for 30 min with low purity $N_2$. All of the bleached pulp samples were made up to 6% solids and placed in the glovebox prior to the purge to ensure that there is no oxygen to react with the hydrosulfite reactant. In rapid succession, 0.2 g of the sodium hydrosulfite was added to ~30 mL of water in a 250 mL beaker and quickly added to the bleached pulps and the bags sealed. Once all bags were sealed they were transferred to the water bath at 80° C. and reacted for 60 min.

TABLE 9

Reductive bleaching conditions.

| | Y |
|---|---|
| %c | 6 |
| $HSO_3^-$ | 1 |

TABLE 9-continued

Reductive bleaching conditions.

| | Y |
|---|---|
| temp, ° C. | 80 |
| time, min | 60 |

Exemplary brightness gains from Y/W treatments appear in Table 10 below

TABLE 10

Brightness gains from Y and W stages.

| Scheme | Y | W |
|---|---|---|
| O/P 2-2/P | 6.30 | 0.70 |
| O/P 4-4/P | 5.20 | 1.90 |
| O/P 4-8/P | 5.60 | 1.60 |
| O/EOP/P 2-2 | 2.60 | 2.80 |
| O/EOP/P 3-3 | 3.50 | 2.70 |
| O/EOP/P 3-4 | 4.60 | 3.10 |
| O/Psv/P | 4.70 | 2.10 |
| Average | 4.64 | 2.13 |

Multistage Bleaching Stage/Washing

Representative results for multi-stage brightening appear in FIG. 1 and Table 11 below

TABLE 11

Color data from 50/50 MP/SOP blended post-$O_2$ stage at different treatment levels.

| Color | 50% MP (O12)/ 50% HBC | O12/EOP (4/8) | O/EOP/ P(2/2) | O/EOP/ P(3/3) | O/EOP/ P(3/4) | O/EOP/ P(2/4) | O/EOP/ P(2/2)/Y | O/EOP/ P(3/3)/Y | O/EOP/ P(3/4)/Y | O/EOP/ P(2/4)/Y |
|---|---|---|---|---|---|---|---|---|---|---|
| $ISO_f$ | 55.49 | 74.50 | 75.01 | 75.00 | 75.58 | 75.46 | 82.10 | 82.03 | 82.89 | 82.94 |
| $L_f$ | 86.08 | 91.90 | 91.99 | 91.68 | 91.74 | 91.71 | 95.00 | 95.03 | 94.90 | 95.05 |

TABLE 11-continued

Color data from 50/50 MP/SOP blended post-O₂ stage at different treatment levels.

| Color | 50% MP (O12)/ 50% HBC | O12/EOP (4/8) | O/EOP/ P(2/2) | O/EOP/ P(3/3) | O/EOP/ P(3/4) | O/EOP/ P(2/4) | O/EOP/ P(2/2)/Y | O/EOP/ P(3/3)/Y | O/EOP/ P(3/4)/Y | O/EOP/ P(2/4)/Y |
|---|---|---|---|---|---|---|---|---|---|---|
| $a_f$ | −0.94 | −1.17 | −1.42 | −1.40 | −1.44 | −1.41 | −78.72 | −1.53 | −1.44 | −1.42 |
| $b_f$ | 12.35 | 5.13 | 4.83 | 4.31 | 3.95 | 4.21 | 4.56 | 4.65 | 3.75 | 3.98 |

O12 refers to oxygen treatment with 12% caustic on pulp

When bleaching 100% MP using the oxygen pre-bleach stage to prepare the furnish for a peroxide/hydrosulfite bleaching sequence, the resultant pulp after bleaching had a 77 ISO Brightness which would be on the lower end of our target brightness range. Given the fact that in the short term the mixed paper would most likely be utilized for SOP supply shortfalls, the logical route to elevating the brightness to our centerline targets would be to blend the bleached mixed paper with the SOP.

Figure 2A:
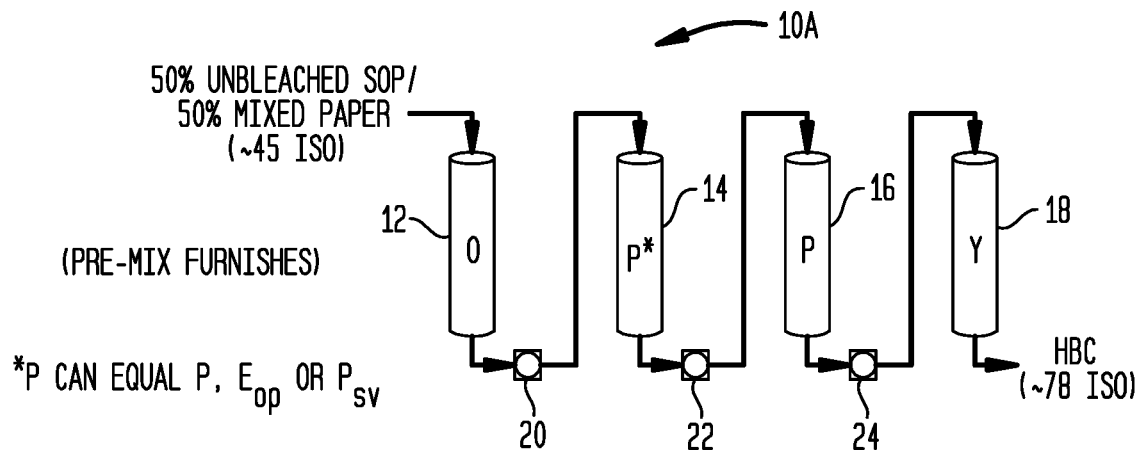
FIG. 2A is a schematic diagram illustrating brightening recycle pulp mixtures.
Figure 2B:
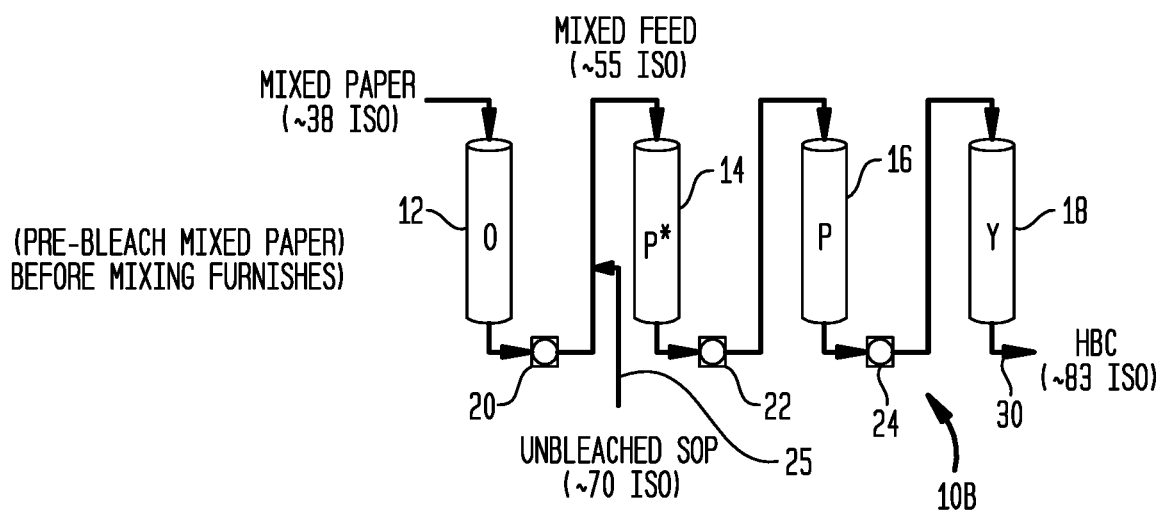
FIG. 2B is a schematic diagram illustrating a preferred method of brightening recycle pulp mixtures.

The results discussed immediately below address how to optimally blend the brown mixed paper (35-40 ISO) with the higher bright, unbleached SOP (65-70 ISO). Blending prior to oxygen bleaching would require larger capital size to accommodate throughput of the entire wastepaper furnish but provide better homogeneity of product and less modification to existing bleach plant operations. Blending after oxygen would require modifying operations somewhat but require smaller capital and reduced chemical consumption for the O₂ stage. (FIG. 2B) This option would also allow the oxygen bleach tower to be installed and treated as a modular add-on fitting into an existing bleach plant. Results indicate that the latter is the preferred option.

Pre-Blends of Mixed Paper and SOP (Option A)

Figure 4:
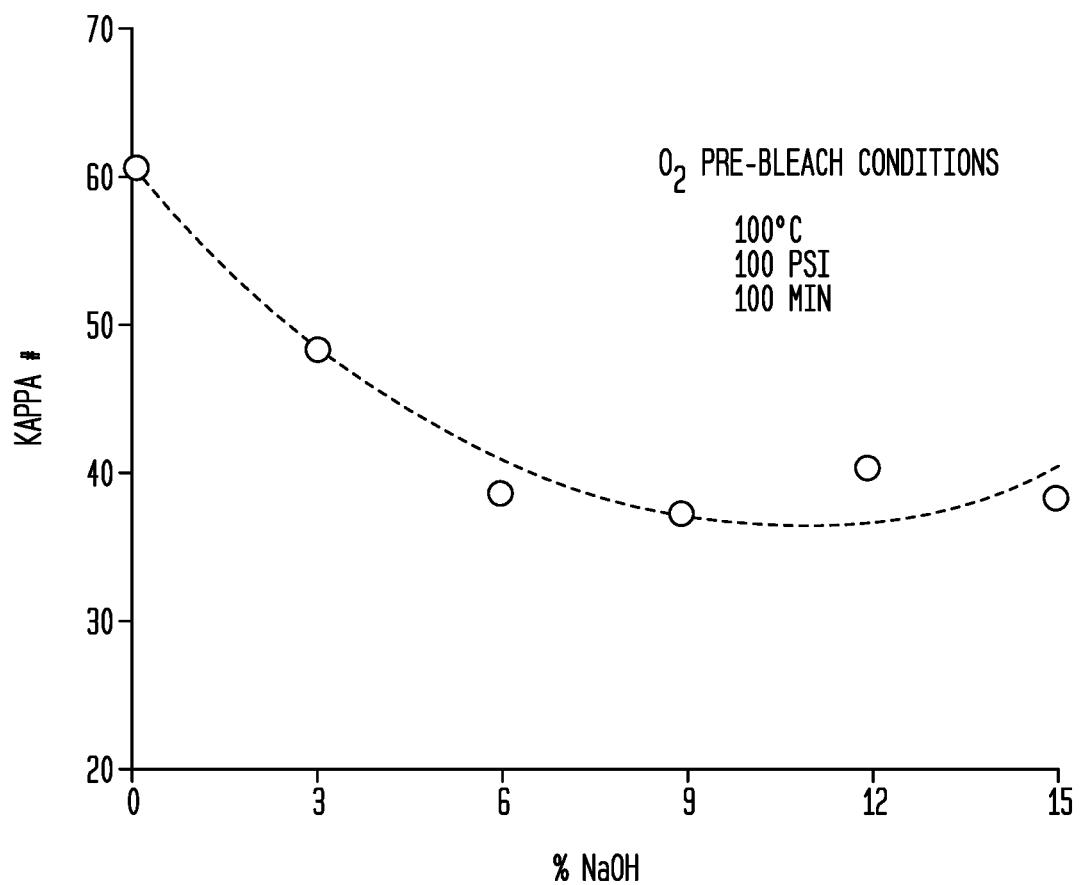
FIG. 4 is a plot of Kappa number versus % caustic on pulp for oxygen pre-treatment of recycle pulps.
Figure 5:
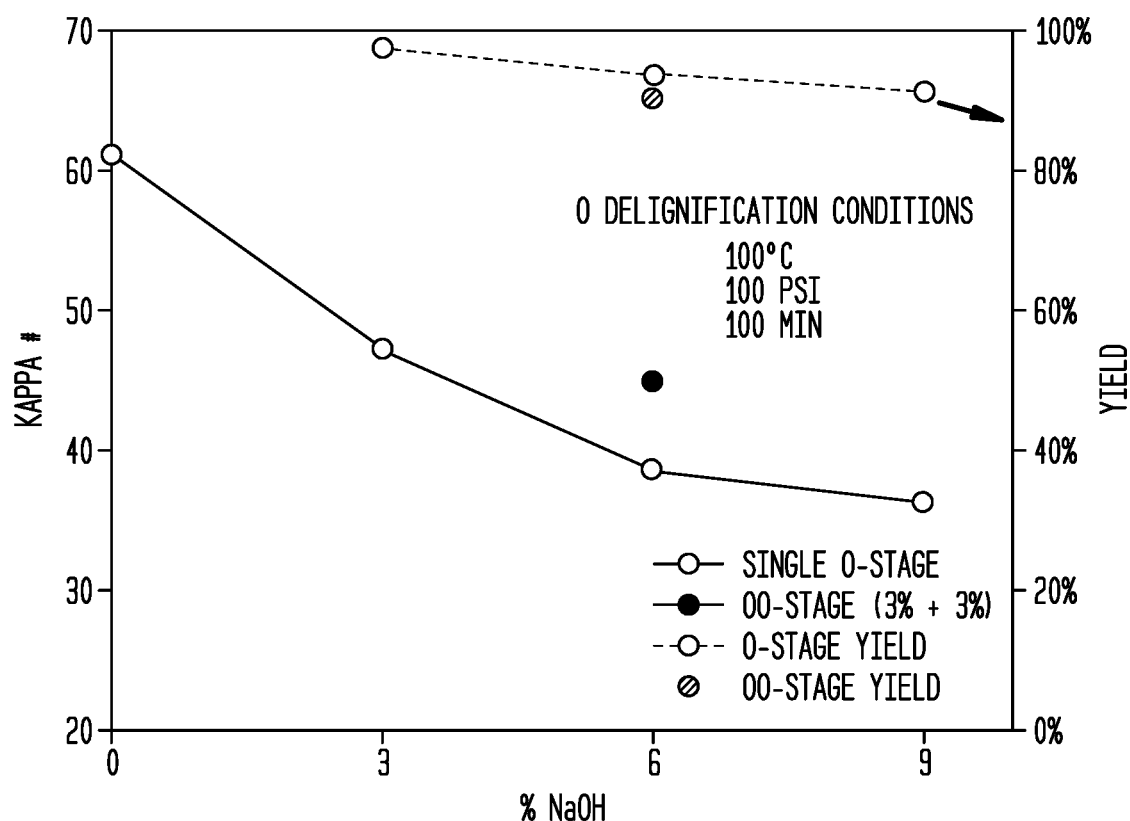
FIG. 5 is a plot of Kappa number and yield versus % caustic on pulp for oxygen treatment of recycle pulp.

Initially, we bleached MP pulp, which is the brown towel furnish comprised of 100% mixed paper, to an ISO of 75+. It was anticipated that blending mixed paper with a brightness of 75+ ISO with the System 2 unbleached pulp having a ceiling brightness in the high 80's would achieve an overall combined brightness in the low to mid 80's. The results from our second efforts were "off", meaning lower than the previous work and instructive to understanding this new feedstock and how to best handle it should we commercialize based on these findings. (Table 12) Specifically, our 100% mixed paper final ISO was lower and the blends did not meet our expected targets. In fact, we barely reached the 80 ISO with a 50% MP/50% SOP blend. Two factors were at work here: 1) based on our Kappa reduction curve and bleaching results (FIG. 4, 5), we reduced the caustic charge in the oxygen pre-bleach, and 2) having pre-blended the pulps prior to O₂ treatment we exposed the SOP pulp with very little lignin content to the caustic.

TABLE 12

Blends v. ISO*

| % SOP | % MP | ISO |
|---|---|---|
| 100 | 0 | 86.0 |
| 50 | 50 | 80.5 |
| 25 | 75 | 74.9 |
| 0 | 100 | 70.8 |

*NOTE:
The 100% SOP with high ISO was not subjected to oxygen pre-treatment.

Figure 6:
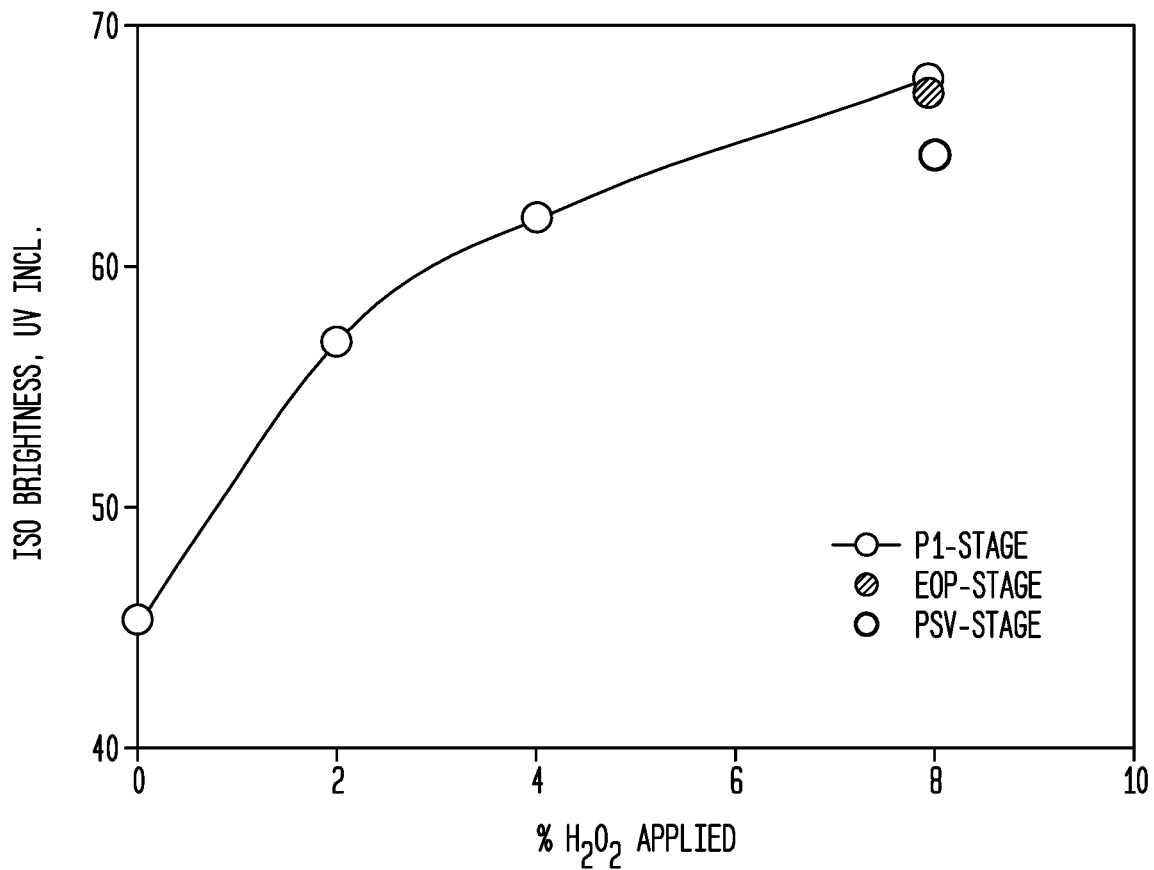
FIG. 6 is a plot of ISO Brightness versus applied peroxide for single stage peroxy bleaching of recycle pulps that have been pre-treated with oxygen.

The resulting pulp is readily beachable as is seen in FIG. 6.

Figure 7:
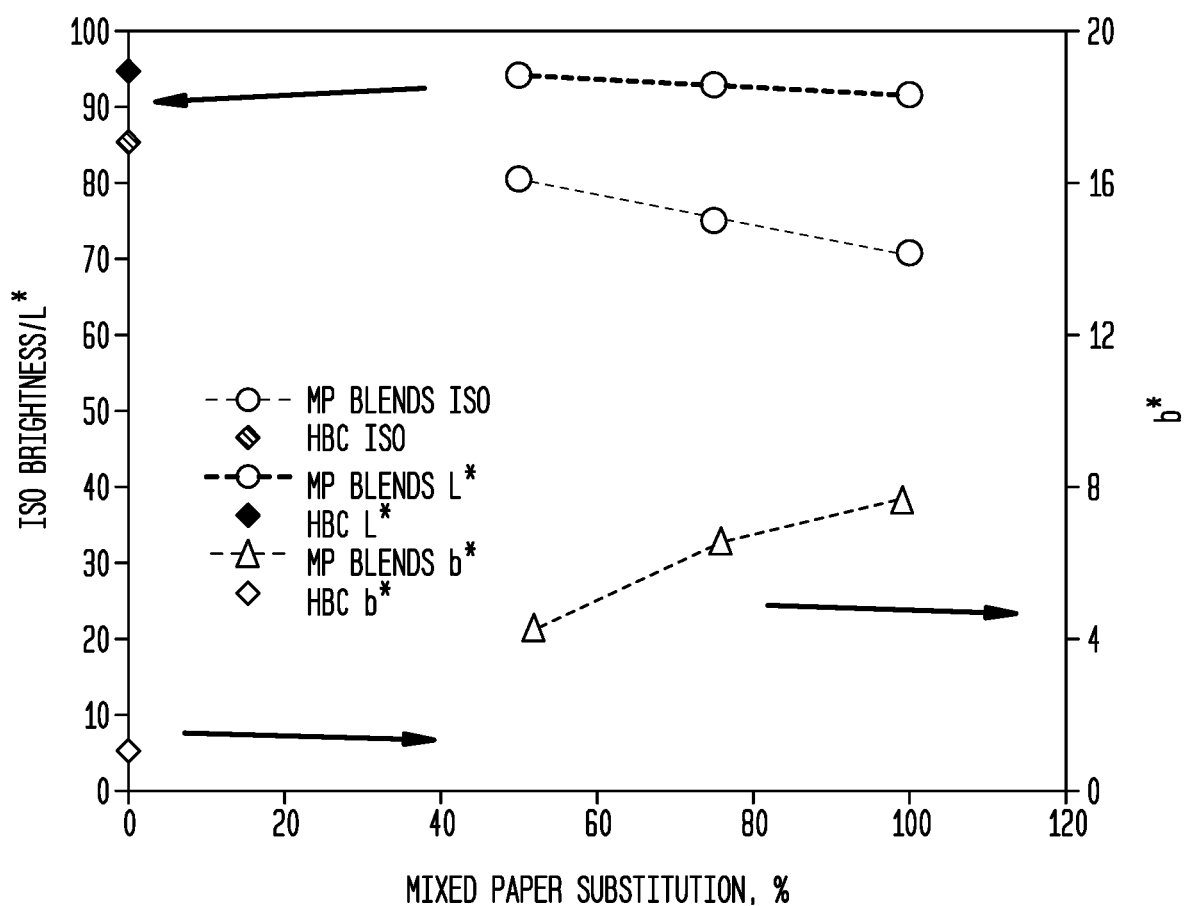
FIG. 7 is a plot of b* values and ISO Brightness versus MP content for bleached recycle pulps.

The experiments summarized in FIG. 7 were done at 3% caustic charge in the oxygen stage and the final pulp had a brightness of only 71 compared with the 77 of the pulp made from the higher caustic treatments. The impact seen from blending the mixed paper with the unbleached SOP was less than expected. In all cases we were battling "yellowness"; the pulp appeared to be bright but had a distinct yellow character that diminished its optical performance and gave the inference of inferior quality.

The L* value represents the lightness (0=black, 100=white) of the pulp and all of the MP/SOP blends lie between 90-95 on the L* scale indicating that all pulps have a bright background. (FIG. 7) Even with all of our blends having a L* value>90, we could barely achieve an 80 brightness with 50% SOP. The 100% SOP has a 9 point differential between L* and ISO and this differential increases with increasing MP substitution. The 100% MP pulp lags 3 points behind the 100% SOP pulp on the whiteness scale and 15 points on the ISO brightness scale. Given the slopes of the two lines, it is apparent that there were are other factors limiting brightness.

The difference between the two pulps is expressed in the b* value, which represents the contrast between blue (−) and yellow (+) on the CIELAB color scale. The greater the magnitude in either positive or negative direction, the greater the appearance imparted on the material. Although it may seem insignificant, the b* for 100% MP was 7.63 versus 0.97 for the 100% SOP. (FIG. 7) The 50/50 blend peaked at just over 80 ISO and had a b* of 3.99. The data indicates that a b* value of <4 is the threshold for high optical brightness pulp from recycled brown paper. The question now was to better understand the phenomenon and how best to control it to obtain maximum performance.

Yellowing is well known to papermaking and it has long been understood as the result of chromophoric (light absorbing) functional groups in the lignin and but also the cellulose in some cases. Chromophores are unsaturated chemical bonds (double bonds) that can absorb light, photo-oxidize and react with other chemical moieties to induce instability and reflect in the yellow range of the visible spectrum. Chromophoric yellowing is prevalent in mechanical grades, particularly newsprint, when left in the sun, the newspaper will quickly yellow due to high lignin contents. Lignin is a heteroaromatic polymer (i.e., it has a lot of unsaturated chemical bonds) and can contain resonance stabilized quinone methide structures that are well known to express color. Previously we reported that mixed paper contains about ⅓ each of mechanical pulp and brown Kraft fibers; it would make sense that the lignin content in mixed paper would contribute to a yellow appearance.

It was postulated that the cellulose-rich SOP pulp may undergo undesirable reactions at the high pH encountered in the oxygen bleaching stage. If one were to determine the makeup of the SOP it would be overwhelmingly white copy grade paper with some contaminant brown Kraft and mechanical fibers. The overall pulp tested out at a Kappa number of 19, indicating the SOP has ~3% lignin in its totality. That lignin content is likely concentrated in the minor content of brown and mechanical grades contained therein. In the oxygen bleach once the oxidizable lignin compounds are reacted, the selectivity of the oxidants to the lignin dramatically decreases and competing side reactions with the cellulose become more prevalent. It would be anticipated that "peeling reactions" would become more commonplace and the result would be an increase in carbonyl and carboxyl structures, both containing unsaturated C=O bonds. These bonds can absorb light and reflect color and can further react to create more chromophoric groups. It was therefore surmised that it may be preferable to avoid the high pH, temperature environment in the treatment of our SOP which is already overwhelmingly lignin free to avoid yellowing reactions.

Figure 8:
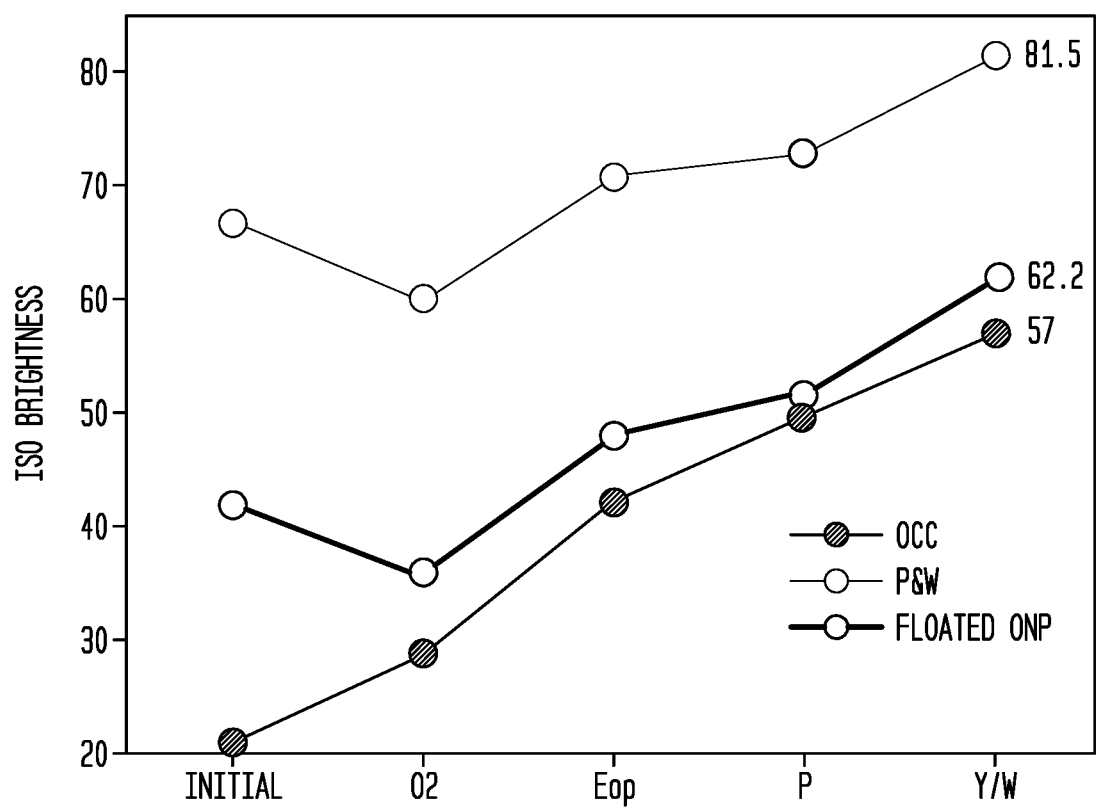
FIG. 8 is a plot of Brightness gains for various recycle pulps for sequential multi-stage bleaching of recycle pulps.

We segregated printing & writing (P&W) grade paper from a bale of mixed paper and subjected it to an O/P/P/Y bleaching sequence, The P&W grade was already 67 ISO and 24 Kappa prior to $O_2$ treatment and the ISO declined 7 points while the Kappa was reduced only 2 points (Table 13 and FIG. 8). It is seen from the data that it is not favorable to subject a white paper furnish to $O_2$ pre-treatment.

TABLE 13

Kappa reduction by $O_2$ pre-bleaching stage.

|  | Starting kappa | Ending kappa |
|---|---|---|
| P&W | 24.3 | 22.3 |
| OCC | 72.7 | 42.6 |
| ONP | 115.3 | 105.1 |

Sorted OCC benefitted from the $O_2$ prebleach in terms of lignin removal and brightness improvement. Given the slope of the brightness gain, the OCC could potentially be bleached further than what was accomplished at 6% caustic. Literature indicates that the 12+% NaOH is required to reduce OCC to a bleachable grade secondary fiber by traditional Kraft bleaching sequences. See U.S. Pat. No. 5,350,493 to Nguyen. Old news print pulp (ONP) does not appear to be very reactive to oxygen in an alkaline environment but on its own brightened gradually. The P&W is known to be bleachable by a P/Y system to 86-88 ISO so the decline in brightness from the alkali darkening was never completely reversed.

Figure 9:
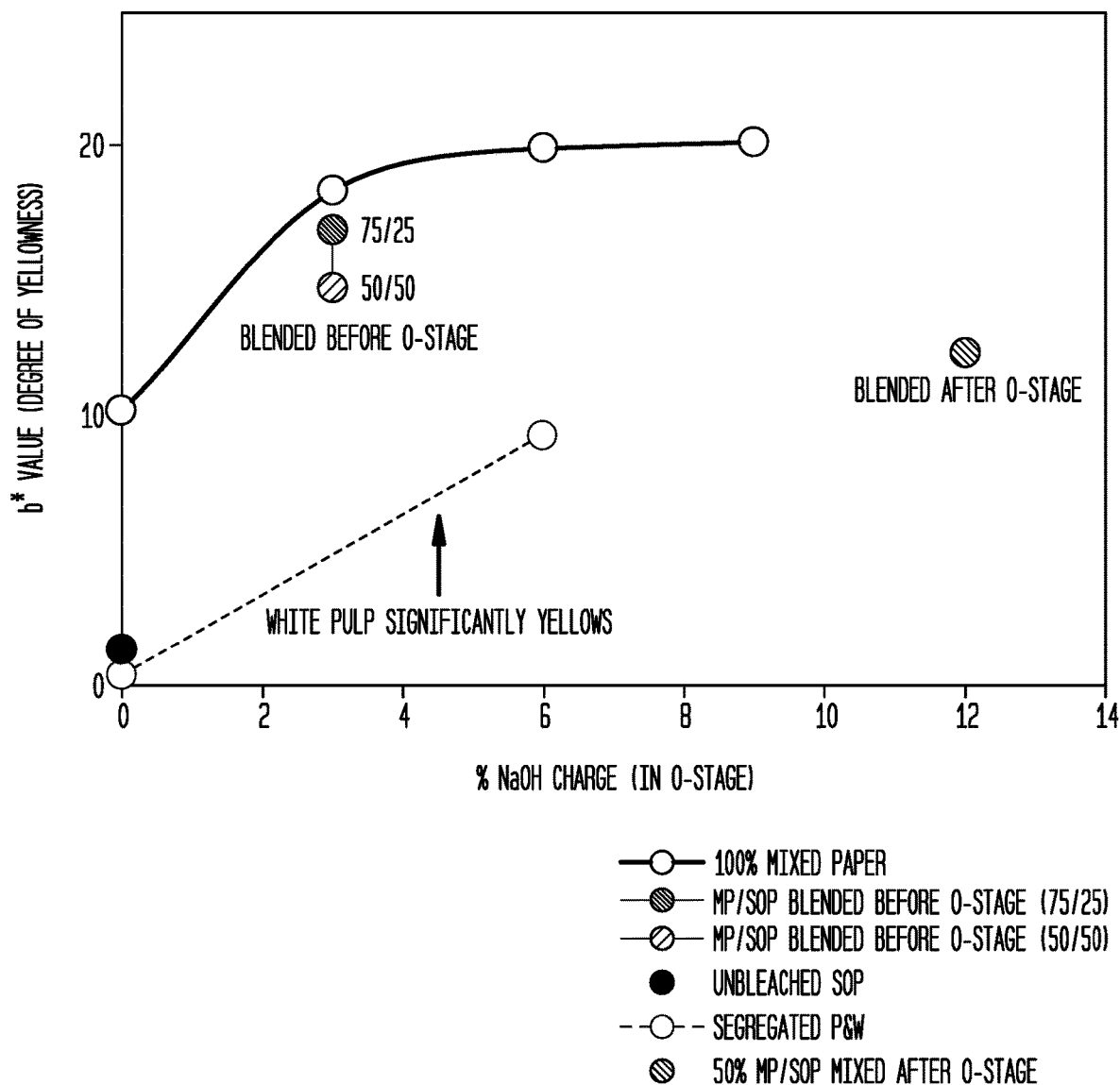
FIG. 9 is a plot of b* versus caustic charge for various pulps and pulp mixtures subjected to an oxygen stage.

To circle back around to the b* value and yellowing, FIG. 9 is summative of the effect of caustic charge and fiber furnish on the b* value of the resultant pulp. We saw a regression in ISO for the segregated P&W of 7 points from 67 to 60; we also saw an increase in b* from 0.6 to 9.3, a very large increase in yellowness. This is confirmation that we need to blend in our SOP after we pre-bleach the mixed paper to maintain a low b* value. It should be noted that while we did reach 81.5 ISO in the end with P&W, we spent all of time and chemical energy reversing this b* decline and only made it back to a b* value of 4 which has consistently been the plateau thus far that we can reverse brightness reversion.

The upper curve above represents the yellowing impact that the alkali has on 100% mixed paper; the brown Kraft fiber particularly has already undergone alkali darkening and yellowing during the Kraft pulping process and overall the MP pulp carries with it a b* value of ~10. This value seems to plateau around 20 for mixed paper after the $O_2$-stage but with the 100% OCC pulp we did see a value of 23. The yellow line represents the b* value of the MP/SOP blends made prior to oxygen treatment. Needless to say, the b* of the pulps is predictable based upon the ratio and final b* of the MP and SOP (20 and 9) by themselves. If anything, the actual value runs slightly higher than the predicted.

The light blue dot out to the right on FIG. 9 provides a segue to the next set of data. This time we pre-bleached mixed pulp and then blended prior to peroxide bleaching. At the 50/50 ratio we were now averaging the high b* of the MP and the low b* of the unbleached SOP. The peroxide bleaching stage hence starts at a b* value of 12.35 in this case rather the 14-20 in the pre-blended pulps. In this case only the MP derived fibers needed heavy bleaching to de-yellow and brighten whereas the SOP derived fibers were already relatively high brightness with little yellowness. The net result was we were able to produce a finished pulp containing 50% MP with a good brightness and low b* value. (FIG. 10).

Figure 10:
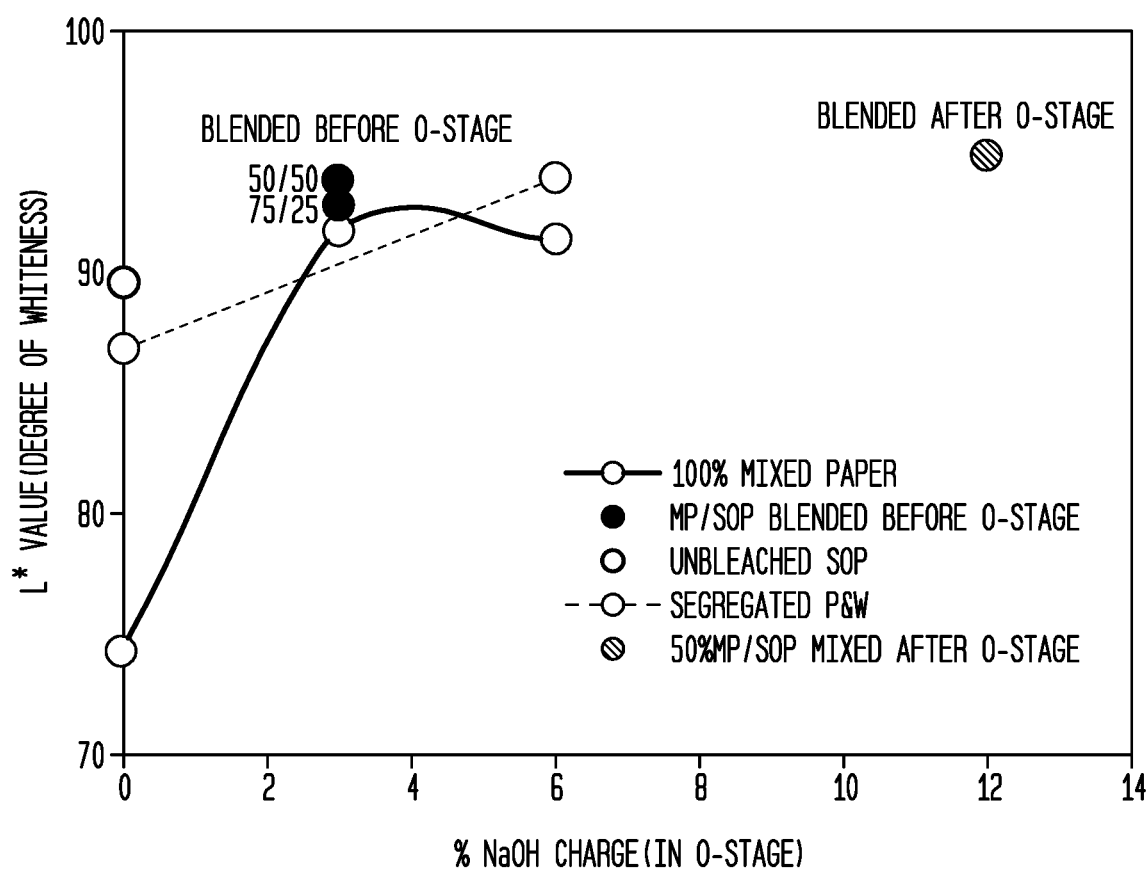
FIG. 10 is a plot of b* for various finished pulps and pulp mixtures versus caustic charge during oxygen pre-treatment.
Figure 11:
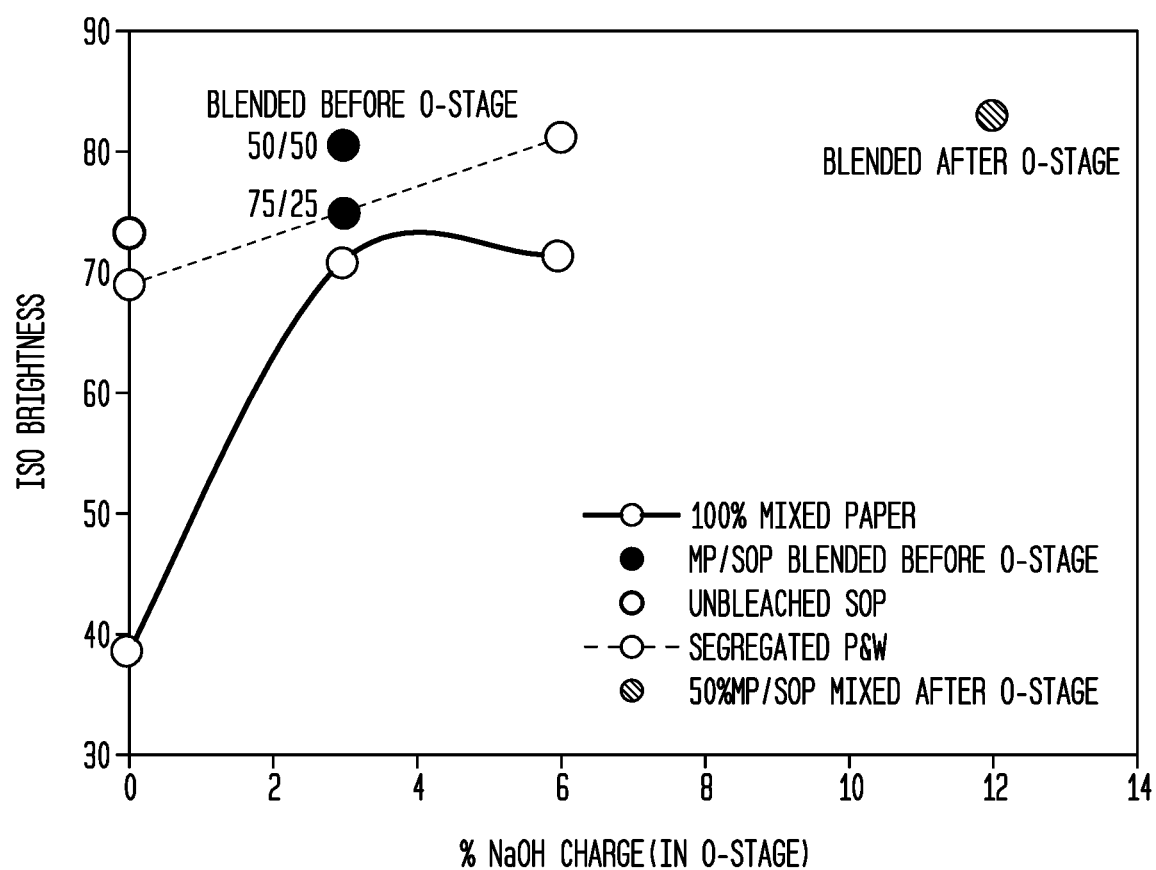
FIG. 11 is a plot of L* whiteness for various finished pulps and pulp mixtures versus caustic charge during oxygen pre-treatment.
Figure 12:
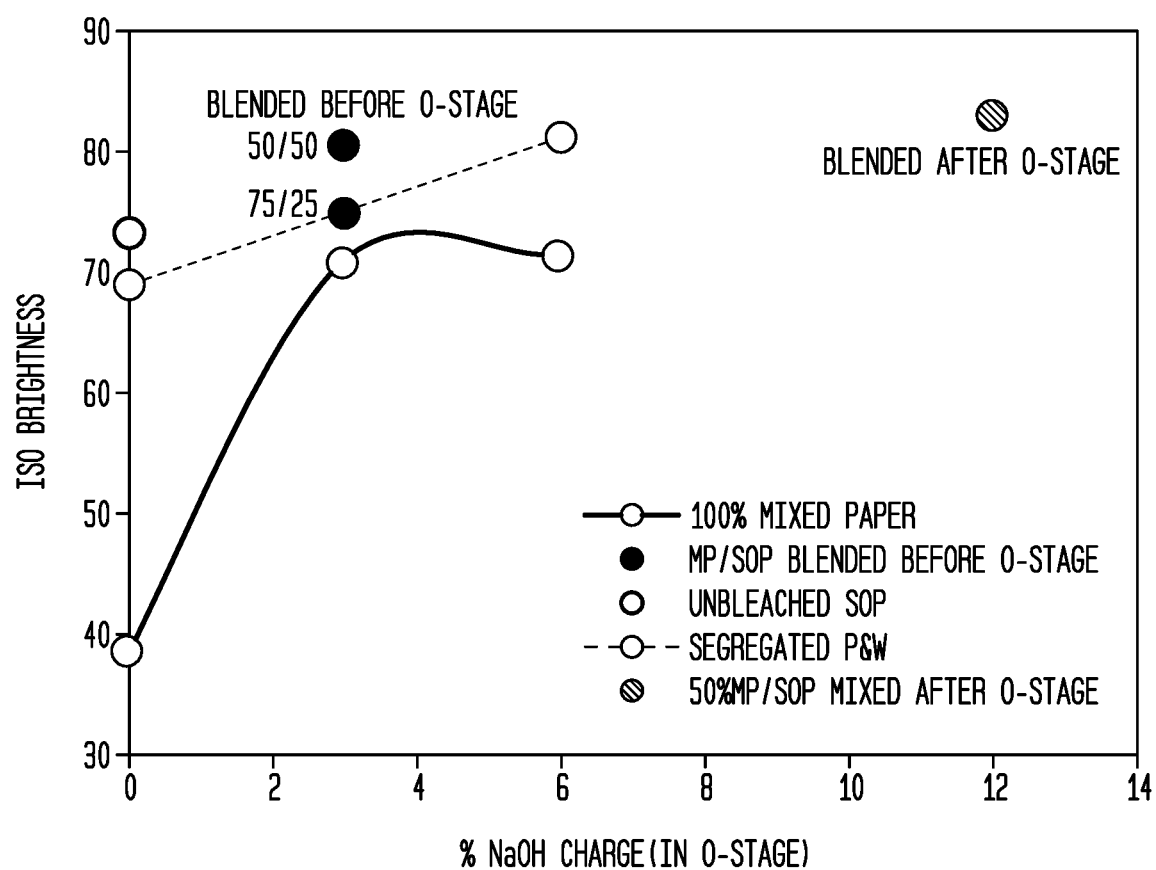
FIG. 12 is a plot of ISO Brightness for various finished pulps and pulp mixtures versus caustic charge during oxygen pre-treatment.

FIGS. 10, 11 and 12 taken together illustrate the preferred path to high brightness with high mixed paper blends. The 50/50 pulp blended before the $O_2$ stage did wind up with a b* value of 3.99 and an ISO of 80.5. The 50/50 blend post-$O_2$ had a b* of 3.75 and an L* a point higher than the pre-blend (94.9 versus 94.0) and that translates into a 2.5 point brightness gain.

Overall, it is seen that secondary fiber made from mixed paper has properties comparable to commercial and internal recycled pulp and can be made internally by adding a single, off-the-shelf unit operation to existing bleaching technology. See Table 14 below.

TABLE 14

Comparison of bulk and strength properties of mixed paper blend versus commercial market pulps.

|  | Bulk ($cm^3$/gm) | Tensile (BL) (km) | Stretch (%) | Tensile Modulus ($kg/mm^2$) | Scott Internal Bond | CSF (mL) |
|---|---|---|---|---|---|---|
| SRM 3 | 1.67 | 3.38 | 3.52 | 109.2 | 118 | 559 |
| Resolute | 1.59 | 3.85 | 3.74 | 116.0 | 136 | 317 |
| 100% bleached MP | 1.52 | 3.33 | 2.79 | 114.7 | 198 | 303 |

EXEMPLARY EMBODIMENTS

There is provided in accordance with the in invention as Embodiment No. 1, a method of making a high brightness papermaking pulp from recycled cellulosic fiber comprising: (a) pre-treating a first recycled cellulosic fiber mix with oxygen; said first recycled cellulosic fiber mix having a first high Kappa number prior to pre-treatment and a reduced Kappa number after pre-treatment that is lower than said first high Kappa number; and (b) blending the pre-treated first recycled cellulosic fiber mix with the reduced Kappa number with a second recycled cellulosic fiber mix having a second Kappa number lower than the first high Kappa number of the first recycled cellulosic fiber mix; and (c) oxidatively bleaching the blended recycled cellulosic fiber mix of step (b); and optionally (d) reductively bleaching the blended recycled cellulosic fiber mix of step (c).

Embodiment No. 2 is the method of making a high brightness papermaking pulp from recycled cellulosic fiber according to Embodiment No. 1, wherein the step of pre-treating the first cellulosic fiber mix with oxygen is carried out at an oxygen pressure of from 0.25-1 MPa.

Embodiment No. 3 is the method of making a high brightness papermaking pulp from recycled cellulosic fiber according to Embodiment Nos. 1 or 2, wherein the step of pre-treating the first cellulosic fiber mix with oxygen is carried out in the presence of an alkaline agent.

Embodiment No. 4 is the method of making a high brightness papermaking pulp from recycled cellulosic fiber according to any of Embodiment Nos. 1, 2 or 3, wherein the step of pre-treating the first cellulosic fiber mix with oxygen is carried out at a pH of from 8 to 13.

Embodiment No. 5 is the method of making a high brightness papermaking pulp from recycled cellulosic fiber according to any one of Embodiment Nos. 1 to 4, wherein the step of pre-treating the first cellulosic fiber mix with oxygen is carried out for a residence time in a bleaching vessel of from 30 to 150 minutes.

Embodiment No. 6 is the method of making a high brightness papermaking pulp from recycled cellulosic fiber according to any one of Embodiment Nos. 1 to 5, wherein the step of pre-treating the first cellulosic fiber mix with oxygen is carried out while applying from 1% to 15% NaOH to the first cellulosic fiber mix based on the dry weight of the first cellulosic fiber mix.

Embodiment No. 7 is the method of making a high brightness papermaking pulp from recycled cellulosic fiber according to any one of Embodiment Nos. 1 to 6, wherein the step of pre-treating the first cellulosic fiber mix with oxygen is effective to reduce the Kappa number of the first cellulosic fiber mix of from 5 to 35 points.

Embodiment No. 8 is the method of making a high brightness papermaking pulp from recycled cellulosic fiber according to any one of Embodiment Nos. 1 to 7, wherein the step of pre-treating the first cellulosic fiber mix with oxygen is effective to increase the ISO Brightness of the first cellulosic fiber mix by from 3-12 points.

Embodiment No. 9 is the method of making a high brightness papermaking pulp from recycled cellulosic fiber according to one of Embodiment Nos. 1 to 8, wherein the step of blending the pre-treated first recycled cellulosic fiber mix with the reduced Kappa number with the second recycled cellulosic fiber mix having a second Kappa number lower than the first high Kappa number of the first recycled cellulosic fiber mix, comprises blending at least 30% by weight of the pre-treated first recycled cellulosic fiber mix with the reduced Kappa number with the second recycled cellulosic fiber mix having a second Kappa number lower than the first high Kappa number of the first recycled cellulosic fiber mix, based on the weight of the blend.

Embodiment No. 10 is the method of making a high brightness papermaking pulp from recycled cellulosic fiber according to any one of Embodiment Nos. 1 to 9, wherein the step of blending the pre-treated first recycled cellulosic fiber mix with the reduced Kappa number with the second recycled cellulosic fiber mix having a second Kappa number lower than the first high Kappa number of the first recycled cellulosic fiber mix, comprises blending at least 40% by weight of the pre-treated first recycled cellulosic fiber mix with the reduced Kappa number with the second recycled cellulosic fiber mix having a second Kappa number lower than the first high Kappa number of the first recycled cellulosic fiber mix, based on the weight of the blend.

Embodiment No. 11 is the method of making a high brightness papermaking pulp from recycled cellulosic fiber according to any one of Embodiment Nos. 1 to 10, wherein the step of blending the pre-treated first recycled cellulosic fiber mix with the reduced Kappa number with the second recycled cellulosic fiber mix having a second Kappa number lower than the first high Kappa number of the first recycled cellulosic fiber mix, comprises blending at least 50% by weight of the pre-treated first recycled cellulosic fiber mix with the reduced Kappa number with the second recycled cellulosic fiber mix having a second Kappa number lower than the first high Kappa number of the first recycled cellulosic fiber mix, based on the weight of the blend.

Embodiment No. 12 is the method of making a high brightness papermaking pulp from recycled cellulosic fiber according to any one of Embodiment Nos. 1 to 11, wherein the step of blending the pre-treated first recycled cellulosic fiber mix with the reduced Kappa number with the second recycled cellulosic fiber mix having a second Kappa number lower than the first high Kappa number of the first recycled cellulosic fiber mix, comprises blending at least 60% by weight of the pre-treated first recycled cellulosic fiber mix with the reduced Kappa number with the second recycled cellulosic fiber mix having a second Kappa number lower than the first high Kappa number of the first recycled cellulosic fiber mix, based on the weight of the blend.

Embodiment No. 13 is the method of making a high brightness papermaking pulp from recycled cellulosic fiber according to any one of Embodiment Nos. 1 to 12, wherein oxidatively bleaching the pre-treated recycled cellulosic fiber mix comprises bleaching the pre-treated recycled cellulosic fiber mix in an extended duration bleaching stage including: (i) providing the pre-treated recycled cellulosic fiber mix in aqueous form to the extended duration bleaching stage at a consistency of from 10% to 30% along with a peroxy bleaching agent and an alkaline agent effective to adjust pH of the charge to 9.5 to 12.5; (ii) bleaching the pulp in the bleaching vessel while maintaining an extended duration bleaching temperature of from 110° F. (43° C.) to 135° F. (57° C.) and a pH of the charge from 9.5 to 12.5 for a bleaching retention time in the extended duration bleaching stage of at least 6 hours.

Embodiment No. 14 is the method of making a high brightness papermaking pulp from recycled cellulosic fiber according to any one of Embodiment Nos. 1 to 13, wherein bleaching the blended pre-treated recycled cellulosic fiber mix comprises oxidatively bleaching the blended pre-treated recycled cellulosic fiber mix, followed by reductively bleaching the blended pre-treated recycled cellulosic fiber mix.

Embodiment No. 15 is the method of making a high brightness papermaking pulp from recycled cellulosic fiber according to any one of Embodiment Nos. 1 to 14, wherein oxidatively bleaching the blended pre-treated recycled cellulosic fiber mix includes bleaching in one or more of an EO stage, an EOP stage, a P stage, a Paa stage or an extended duration bleaching stage which includes (i) providing the blended pre-treated recycled cellulosic fiber mix in aqueous form to the extended duration bleaching stage at a consistency of from 10% to 30% along with a peroxy bleaching agent and an alkaline agent effective to adjust pH of the charge to 9.5 to 12.5; (ii) bleaching the blended pre-treated recycled cellulosic fiber mix in the bleaching vessel while maintaining an extended duration bleaching temperature of from 110° F. (43° C.) to 135° F. (57° C.) and a pH of the charge from 9.5 to 12.5 for a bleaching retention time in the extended duration bleaching stage of at least 6 hours.

Embodiment No. 16 is the method of making a high brightness papermaking pulp from recycled cellulosic fiber according to any one of Embodiment Nos. 1 to 15, wherein bleaching the blended pre-treated recycled cellulosic fiber mix comprises sequentially bleaching the recycled cellulosic fiber mix in an EOP stage, followed by a P stage, followed by a Y stage.

Embodiment No. 17 is the method of making a high brightness papermaking pulp from recycled cellulosic fiber according to any one of Embodiment Nos. 1 to 16, wherein bleaching the blended pre-treated recycled cellulosic fiber mix comprises sequentially bleaching the blended recycled cellulosic fiber mix in a P stage, followed by another P stage, followed by a Y stage.

Embodiment No. 18 is the method of making a high brightness papermaking pulp from recycled cellulosic fiber according to any one of Embodiment Nos. 1 to 17, wherein bleaching the blended pre-treated recycled cellulosic fiber mix comprises sequentially bleaching the blended recycled cellulosic fiber mix in an extended duration bleaching stage which includes (i) providing the blended pre-treated recycled cellulosic fiber mix in aqueous form to the extended duration bleaching stage at a consistency of from 10% to 30% along with a peroxy bleaching agent and an alkaline agent effective to adjust pH of the charge to 9.5 to 12.5; (ii) bleaching the pulp in the bleaching vessel while maintaining an extended duration bleaching temperature of from 110° F. (43° C.) to 135° F. (57° C.) and a pH of the charge from 9.5 to 12.5 for a bleaching retention time in the extended duration bleaching stage of at least 6 hours, followed by a P stage, followed by a Y stage.

Embodiment No. 19 is the method of making a high brightness papermaking pulp from recycled cellulosic fiber according to any one of Embodiment Nos. 1 to 18, wherein bleaching the blended pre-treated recycled cellulosic fiber mix in comprises sequentially bleaching the recycled cellulosic fiber mix in an extended duration bleaching stage which includes (i) providing the blended pre-treated recycled cellulosic fiber mix in aqueous form to the extended duration bleaching stage at a consistency of from 10% to 30% along with a peroxy bleaching agent and an alkaline agent effective to adjust pH of the charge to 9.5 to 12.5; (ii) bleaching the pulp in the bleaching vessel while maintaining an extended duration bleaching temperature of from 110° F. (43° C.) to 135° F. (57° C.) and a pH of the charge from 9.5 to 12.5 for a bleaching retention time in the extended duration bleaching stage of at least 6 hours, followed by a Y stage.

Embodiment No. 20 is the method of making a high brightness papermaking pulp from recycled cellulosic fiber according to any one of Embodiment Nos. 1 to 19, wherein bleaching the blended pre-treated recycled cellulosic fiber mix comprises sequentially bleaching the blended recycled cellulosic fiber mix in a P stage, followed by an EOP stage, followed by a Y stage.

Embodiment No. 21 is the method of making a high brightness papermaking pulp from recycled cellulosic fiber according to any one of Embodiment Nos. 1 to 20, wherein bleaching the blended pre-treated recycled cellulosic fiber mix comprises sequentially bleaching the blended recycled cellulosic fiber mix in an EOP stage, followed by a Y stage.

Embodiment No. 22 is the method of making a high brightness papermaking pulp from recycled cellulosic fiber according to any one of Embodiment Nos. 1 to 21, wherein bleaching the blended pre-treated recycled cellulosic fiber mix comprises sequentially bleaching the blended pre-treated recycled cellulosic fiber mix in an EOP stage, followed by a Paa stage, followed by a Y stage.

Embodiment No. 23 is a papermaking pulp consisting essentially of recycled cellulosic fiber having a Kappa number higher than 15 and an ISO Brightness of more than 80 prepared by the method of any of Embodiment Nos. 1 to 22.

Embodiment No. 24 is a method of pre-treating and bleaching papermaking pulp from recycled cellulosic fiber comprising: (a) pre-treating a recycled cellulosic fiber mix with oxygen, said recycled cellulosic fiber mix having a first high Kappa number prior to pre-treatment and a reduced Kappa number after pre-treatment that is lower than said first high Kappa number; and (b) bleaching the pre-treated recycled cellulosic fiber mix of step (a).

Embodiment No. 25 is the method of pre-treating and bleaching papermaking pulp from recycled cellulosic fiber according to Embodiment No. 24, wherein the step of pre-treating the recycled cellulosic fiber mix with oxygen is carried out at an oxygen pressure of from 0.25-1 MPa.

Embodiment No. 26 is the method of pre-treating and bleaching papermaking pulp from recycled cellulosic fiber according to Embodiment Nos. 24 or 25, wherein the step of pre-treating the recycled cellulosic fiber mix with oxygen is carried out in the presence of an alkaline agent.

Embodiment No. 27 is the method of pre-treating and bleaching papermaking pulp from recycled cellulosic fiber according to Embodiment Nos. 24, 25 or 26, wherein the step of pre-treating the recycled cellulosic fiber mix with oxygen is carried out at a pH of from 8 to 13.

Embodiment No. 28 is the method of pre-treating and bleaching papermaking pulp from recycled cellulosic fiber according to any of Embodiment Nos. 24 to 27, wherein the step of pre-treating the recycled cellulosic fiber mix with oxygen is carried out for a residence time in a bleaching vessel of from 30 to 150 minutes.

Embodiment No. 29 is the method of pre-treating and bleaching papermaking pulp from recycled cellulosic fiber according to any of Embodiment Nos. 24 to 28, wherein the step of pre-treating the recycled cellulosic fiber mix with oxygen is carried out while applying from 1% to 15% NaOH to the recycled cellulosic fiber mix based on the dry weight of the first cellulosic fiber mix.

Embodiment No. 30 is the method of pre-treating and bleaching papermaking pulp from recycled cellulosic fiber according to any of Embodiment Nos. 24 to 29, wherein the step of pre-treating the recycled cellulosic fiber mix with oxygen is effective to reduce the Kappa number of the first cellulosic fiber mix of from 5 to 35 points.

Embodiment No. 31 is the method of pre-treating and bleaching papermaking pulp from recycled cellulosic fiber according to any of Embodiment Nos. 24 to 30, wherein the step of pre-treating the first cellulosic fiber mix with oxygen is effective to increase the ISO Brightness of the first cellulosic fiber mix by from 3-12 points.

Embodiment No. 32 is the method of pre-treating and bleaching papermaking pulp from recycled cellulosic fiber according to any of Embodiment Nos. 24 to 31, wherein bleaching the pre-treated recycled cellulosic fiber mix comprises bleaching the pre-treated recycled cellulosic fiber mix in an extended duration bleaching stage including: (i) providing the aqueous cellulosic pulp to the extended duration bleaching stage at a consistency of from 10% to 30% along with a peroxy bleaching agent and an alkaline agent effective to adjust pH of the charge to 9.5 to 12.5; (ii) bleaching the pulp in the bleaching vessel while maintaining an extended duration bleaching temperature of from 110° F. (43° C.) to 135° F. (57° C.) and a pH of the charge from 9.5 to 12.5 for a bleaching retention time in the extended duration bleaching stage of at least 6 hours.

Embodiment No. 33 is the method of pre-treating and bleaching papermaking pulp from recycled cellulosic fiber according to any of Embodiment Nos. 24 to 32, wherein bleaching the pre-treated recycled cellulosic fiber mix comprises bleaching the pre-treated recycled cellulosic fiber mix in a plurality of bleaching stages.

Embodiment No. 34 is the method of pre-treating and bleaching papermaking pulp from recycled cellulosic fiber according to Embodiment No. 33, wherein the plurality of bleaching stages include one or more of an EO stage, an EOP stage, a P stage, a Paa stage, a Y stage or an extended duration bleaching stage which includes (i) providing the aqueous cellulosic pulp to the extended duration bleaching stage at a consistency of from 10% to 30% along with a peroxy bleaching agent and an alkaline agent effective to adjust pH of the charge to 9.5 to 12.5; (ii) bleaching the pulp in the bleaching vessel while maintaining an extended duration bleaching temperature of from 110° F. (43° C.) to 135° F. (57° C.) and a pH of the charge from 9.5 to 12.5 for a bleaching retention time in the extended duration bleaching stage of from 6 to 90 hours.

Embodiment No. 35 is the method of pre-treating and bleaching papermaking pulp from recycled cellulosic fiber according to Embodiment No. 33, wherein bleaching the pre-treated recycled cellulosic fiber mix in a plurality of bleaching stages comprises sequentially bleaching the recycled cellulosic fiber mix in an EOP stage, followed by a P stage, followed by a Y stage.

Embodiment No. 36 is the method of pre-treating and bleaching papermaking pulp from recycled cellulosic fiber according to Embodiment No. 33 wherein bleaching the pre-treated recycled cellulosic fiber mix in a plurality of bleaching stages comprises sequentially bleaching the recycled cellulosic fiber mix in a P stage, followed by another P stage, followed by a Y stage.

Embodiment No. 37 is the method of pre-treating and bleaching papermaking pulp from recycled cellulosic fiber according to Embodiment No. 33, wherein bleaching the pre-treated recycled cellulosic fiber mix in a plurality of bleaching stages comprises sequentially bleaching the recycled cellulosic fiber mix in an extended duration bleaching stage which includes (i) providing the aqueous cellulosic pulp to the extended duration bleaching stage at a consistency of from 10% to 30% along with a peroxy bleaching agent and an alkaline agent effective to adjust pH of the charge to 9.5 to 12.5; (ii) bleaching the pulp in the bleaching vessel while maintaining an extended duration bleaching temperature of from 110° F. (43° C.) to 135° F. (57° C.) and a pH of the charge from 9.5 to 12.5 for a bleaching retention time in the extended duration bleaching stage of at least 6 hours, followed by a P stage, followed by a Y stage.

Embodiment No. 38 is the method of pre-treating and bleaching papermaking pulp from recycled cellulosic fiber according to Embodiment No. 33, wherein bleaching the pre-treated recycled cellulosic fiber mix in a plurality of bleaching stages comprises sequentially bleaching the recycled cellulosic fiber mix in an extended duration bleaching stage which includes (i) providing the aqueous cellulosic pulp to the extended duration bleaching stage at a consistency of from 10% to 30% along with a peroxy bleaching agent and an alkaline agent effective to adjust pH of the charge to 9.5 to 12.5; (ii) bleaching the pulp in the bleaching vessel while maintaining an extended duration bleaching temperature of from 110° F. (43° C.) to 135° F. (57° C.) and a pH of the charge from 9.5 to 12.5 for a bleaching retention time in the extended duration bleaching stage of at least 6 hours, followed by a Y stage.

Embodiment No. 39 is the method of pre-treating and bleaching papermaking pulp from recycled cellulosic fiber according to Embodiment No. 33, wherein bleaching the pre-treated recycled cellulosic fiber mix in a plurality of bleaching stages comprises sequentially bleaching the recycled cellulosic fiber mix in a P stage, followed by an EOP stage, followed by a Y stage.

Embodiment No. 40 is the method of pre-treating and bleaching papermaking pulp from recycled cellulosic fiber according to Embodiment No. 33, wherein bleaching the pre-treated recycled cellulosic fiber mix in a plurality of bleaching stages comprises sequentially bleaching the recycled cellulosic fiber mix in an EOP stage, followed by a Y stage.

Embodiment No. 41 is the method of pre-treating and bleaching papermaking pulp from recycled cellulosic fiber according to Embodiment No. 33, wherein bleaching the pre-treated recycled cellulosic fiber mix in a plurality of bleaching stages comprises sequentially bleaching the recycled cellulosic fiber mix in an EOP stage, followed by a Paa stage, followed by a Y stage.

Embodiment No. 42 is a papermaking pulp consisting essentially of recycled cellulosic fiber having a Kappa number higher than 15 and an ISO Brightness of more than 80.

Embodiment No. 43 is the papermaking pulp according to Embodiment No. 42, having a Kappa number higher than 15 and less than 40.

Embodiment No. 44 is the papermaking pulp according to Embodiment No. 42, having a Kappa number higher than 15 and less than 35.

Embodiment No. 45 is the papermaking pulp according to Embodiment No. 44, having a Kappa number higher than 15 and less than 30.

Embodiment No. 46 is the papermaking pulp according to Embodiment No. 45, having a Kappa number higher than 15 and less than 25.

Embodiment No. 47 is the papermaking pulp according to Embodiment No. 42, having a Kappa number higher than 20 and less than 40.

Embodiment No. 48 is the papermaking pulp according to Embodiment No. 47, having a Kappa number higher than 20 and less than 35.

Embodiment No. 49 is the papermaking pulp according to Embodiment No. 48, having a Kappa number higher than 20 and less than 30.

Embodiment No. 50 is the papermaking pulp according to Embodiment No. 42, prepared from a recycled cellulosic fiber mixture containing less than 50 wt. % mechanical pulp, based on the dry weight of the fiber mixture.

Embodiment No. 51 is the papermaking pulp according to Embodiment No. 42, prepared from a recycled cellulosic fiber mixture containing less than 40 wt. % mechanical pulp, based on the dry weight of the fiber mixture.

Embodiment No. 52 is the papermaking pulp according to Embodiment No. 42, prepared from a recycled cellulosic fiber mixture containing less than 30 wt. % mechanical pulp, based on the dry weight of the fiber mixture.

Embodiment No. 53 is the papermaking pulp according to Embodiment No. 42, prepared from a recycled cellulosic fiber mixture containing less than 25 wt. % mechanical pulp, based on the dry weight of the fiber mixture.

Embodiment No. 54 is the papermaking pulp according to Embodiment No. 42, prepared from a recycled cellulosic fiber mixture containing less than 30 wt. % mechanical pulp, based on the dry weight of the fiber mixture.

Embodiment No. 55 is the papermaking pulp according to Embodiment No. 42, prepared from a recycled cellulosic fiber mixture containing less than 30 wt. % mechanical pulp, based on the dry weight of the fiber mixture.

While the invention has been described in detail, modifications within the spirit and scope of the invention will be readily apparent to those of skill in the art. Such modifications are also to be considered as part of the present invention. In view of the foregoing discussion, relevant knowledge in the art and references discussed above in connection with the foregoing description including the Detailed Description and Background of the Invention, the disclosures of which are all incorporated herein by reference, further description is deemed unnecessary. In addition, it should be understood from the foregoing discussion that aspects of the invention and portions of various embodiments may be combined or interchanged either in whole or in part. Furthermore, those of ordinary skill in the art will appreciate that the foregoing description is by way of example only, and is not intended to limit the invention.

What is claimed is:

1. A method of making a high brightness papermaking pulp from recycled cellulosic fiber comprising:
   (a) pre-treating a first recycled cellulosic fiber mix with oxygen;
      said first recycled cellulosic fiber mix having a first high Kappa number greater than 20 prior to pre-treatment and a reduced Kappa number after pre-treatment that is lower than said first high Kappa number by less than 40% to form a pre-treated first recycled cellulosic fiber mix; and
   (b) blending the pre-treated first recycled cellulosic fiber mix with the reduced Kappa number with a second recycled cellulosic fiber mix having a second Kappa number lower than the first high Kappa number of the first recycled cellulosic fiber mix to form a blended recycled cellulosic fiber mix; and
   (c) oxidatively bleaching the blended recycled cellulosic fiber mix of step (b) in a bleaching vessel; and optionally
   (d) reductively bleaching the blended recycled cellulosic fiber mix of step (c) to form a papermaking pulp for use as a furnish supply in a papermaking machine.

2. The method of making a high brightness papermaking pulp from recycled cellulosic fiber according to claim 1, wherein the step of pre-treating the first cellulosic fiber mix with oxygen is carried out in the presence of an alkaline agent.

3. The method of making a high brightness papermaking pulp from recycled cellulosic fiber according to claim 1, wherein the step of pre-treating the first cellulosic fiber mix with oxygen is carried out for a residence time in a bleaching vessel of from 30 to 150 minutes.

4. The method of making a high brightness papermaking pulp from recycled cellulosic fiber according to claim 1, wherein the step of pre-treating the first cellulosic fiber mix with oxygen is effective to reduce the Kappa number of the first cellulosic fiber mix of from 10 to 30 points.

5. The method of making a high brightness papermaking pulp from recycled cellulosic fiber according to claim 1, wherein the step of pre-treating the first cellulosic fiber mix with oxygen is effective to increase the ISO Brightness of the first cellulosic fiber mix by from 3-12 points.

6. The method of making a high brightness papermaking pulp from recycled cellulosic fiber according to claim 1, wherein the step of blending the pre-treated first recycled cellulosic fiber mix with the reduced Kappa number with the second recycled cellulosic fiber mix having a second Kappa number lower than the first high Kappa number of the first recycled cellulosic fiber mix, comprises blending at least 30% by weight of the pre-treated first recycled cellulosic fiber mix with the reduced Kappa number with the second recycled cellulosic fiber mix having a second Kappa number lower than the first high Kappa number of the first recycled cellulosic fiber mix, based on the weight of the blend.

7. The method of making a high brightness papermaking pulp from recycled cellulosic fiber according to claim 1, wherein oxidatively bleaching the blended recycled cellulosic fiber mix comprises bleaching the blended recycled cellulosic fiber mix in an extended duration bleaching stage including: (i) providing the blended recycled cellulosic fiber mix in aqueous form to the extended duration bleaching stage at a consistency of from 10% to 30% along with a peroxy bleaching agent and an alkaline agent effective to adjust pH of the charge to 9.5 to 12.5; (ii) bleaching the pulp in the bleaching vessel while maintaining an extended duration bleaching temperature of from 110° F. (43° C.) to 135° F. (57° C.) and a pH of the charge from 9.5 to 12.5 for a bleaching retention time in the extended duration bleaching stage of at least 6 hours.

8. The method of making a high brightness papermaking pulp from recycled cellulosic fiber according to claim 1, wherein oxidatively bleaching the blended recycled cellulosic fiber mix is followed by reductively bleaching the blended recycled cellulosic fiber mix.

9. The method of making a high brightness papermaking pulp from recycled cellulosic fiber according to claim 1, wherein oxidatively bleaching the blended recycled cellulosic fiber mix includes bleaching in one or more of an EO stage, an EOP stage, a P stage, a Paa stage or an extended duration bleaching stage which includes (i) providing the blended recycled cellulosic fiber mix in aqueous form to the extended duration bleaching stage at a consistency of from 10% to 30% along with a peroxy bleaching agent and an alkaline agent effective to adjust pH of the charge to 9.5 to 12.5; (ii) bleaching the blended recycled cellulosic fiber mix in the bleaching vessel while maintaining an extended duration bleaching temperature of from 110° F. (43° C.) to 135° F. (57° C.) and a pH of the charge from 9.5 to 12.5 for a bleaching retention time in the extended duration bleaching stage of at least 6 hours.

10. The method of making a high brightness papermaking pulp from recycled cellulosic fiber according to claim 1, wherein bleaching the blended recycled cellulosic fiber mix comprises sequentially bleaching the blended recycled cellulosic fiber mix in an EOP stage, followed by a P stage, followed by a Y stage.

11. The method of making a high brightness papermaking pulp from recycled cellulosic fiber according to claim 1, wherein bleaching the blended recycled cellulosic fiber mix comprises sequentially bleaching the blended recycled cellulosic fiber mix in a P stage, followed by an EOP stage, followed by a Y stage.

12. The method of making a high brightness papermaking pulp from recycled cellulosic fiber according to claim 1, wherein first recycled cellulosic fiber mix comprises Mixed Paper (MP).

13. The method of making a high brightness papermaking pulp from recycled cellulosic fiber according to claim 12, wherein the second recycled cellulosic fiber mix comprises Sorted Office Waste (SOW).

14. The method of making a high brightness papermaking pulp from recycled cellulosic fiber according to claim 12, wherein the step of blending the pre-treated first recycled cellulosic fiber mix with the reduced Kappa number with the second recycled cellulosic fiber mix having a second Kappa number lower than the first high Kappa number of the first recycled cellulosic fiber mix, comprises blending at least 30% by weight of the pre-treated first recycled cellulosic fiber mix with the reduced Kappa number with the second recycled cellulosic fiber mix having a second Kappa number lower than the first high Kappa number of the first recycled cellulosic fiber mix, based on the weight of the blend.

15. The method of making a high brightness papermaking pulp from recycled cellulosic fiber according to claim 1, wherein first recycled cellulosic fiber mix comprises an ISO Brightness of from about 35 to about 40 and a first high Kappa number of from about 60 to about 65 prior to pre-treatment.

16. The method of making a high brightness papermaking pulp from recycled cellulosic fiber according to claim 15, wherein the second recycled cellulosic fiber mix comprises an ISO Brightness of from about 65 to about 70 and a Kappa number of less than about 20.

17. The method of making a high brightness papermaking pulp from recycled cellulosic fiber according to claim 1, wherein the high brightness papermaking pulp from recycled cellulosic fiber has a Kappa number higher than 15 and an ISO Brightness of more than 80.

18. The method of making a high brightness papermaking pulp from recycled cellulosic fiber according to claim 16, wherein the high brightness papermaking pulp from recycled cellulosic fiber has a Kappa number higher than 15 and an ISO Brightness of more than 80.

19. The method of making a high brightness papermaking pulp from recycled cellulosic fiber according to claim 1, wherein the step of pre-treating the first cellulosic fiber mix with oxygen is effective to increase the ISO Brightness of the first cellulosic fiber mix by from 3-12 points.

20. The method of making a high brightness papermaking pulp from recycled cellulosic fiber according to claim 1, wherein the first recycled cellulosic fiber mix is derived from a first post-consumer waste source and the second recycled cellulosic fiber mix is derived from a second post-consumer waste source different from the first post-consumer waste source.

* * * * *